United States Patent [19]
Abe

[11] Patent Number: 5,559,729
[45] Date of Patent: Sep. 24, 1996

[54] METHOD FOR DESIGNING PNEUMATIC TIRES

[75] Inventor: Akihiko Abe, Kodaira, Japan

[73] Assignee: Bridgestone Corporation, Tokyo, Japan

[21] Appl. No.: 317,593

[22] Filed: Oct. 3, 1994

[30] Foreign Application Priority Data

| Oct. 6, 1993 | [JP] | Japan | 5-250371 |
| Sep. 29, 1994 | [JP] | Japan | 6-235730 |

[51] Int. Cl.$^6$ .............................. G06F 17/11; G06F 17/50
[52] U.S. Cl. ................................ 364/578; 364/512
[58] Field of Search ........................ 364/578, 512

[56] References Cited

U.S. PATENT DOCUMENTS

| 5,295,087 | 3/1994 | Yoshida et al. | 364/578 |
| 5,396,438 | 3/1995 | Oblizajek | 364/552 |

OTHER PUBLICATIONS

*Genetic Algorithm*, Kitano, Hiroaki ed., 1993, (Sangyo--Tosho Publishing Corporation Ltd.), Chapters 1, 2 and 3 (including English translations).
Goldberg, David E., "Genetic Algorithms, in Search, Optimization and Machine Learning," 1989 (Addison–Wesley Publishing Company, Inc.) pp. 1–88.

*Primary Examiner*—Michael Zanelli
*Attorney, Agent, or Firm*—Oliff & Berridge

[57] ABSTRACT

In order to perform tire design and development highly efficiently and provide a tire at low cost, a tire basic model for representing a tire cross-sectional shape including an internal structure and being divided into a plurality of elements, an objective function for representing a physical quantity for evaluation of tire performance, design variables for determining a physical property of rubber members, and a constraint condition for constraining the physical property of the rubber members are determined (100, 102). A value of the objective function and a value of the constraint condition are calculated in accordance with Young's moduli of the rubber members when the design variable is altered by a unit quantity $\Delta r_i$, and a sensitivity is calculated for each of the design variables (106–112). Predicted values of variation quantities of the design variables for maximizing the value of the objective function while satisfying the constraint condition are calculated by using the sensitivity (114). The steps described above are repeated until the value of the objective function converges (118). Young's moduli of the rubber members are determined on the basis of design variables when the value of the objective function converges to a predicted value (120).

10 Claims, 19 Drawing Sheets

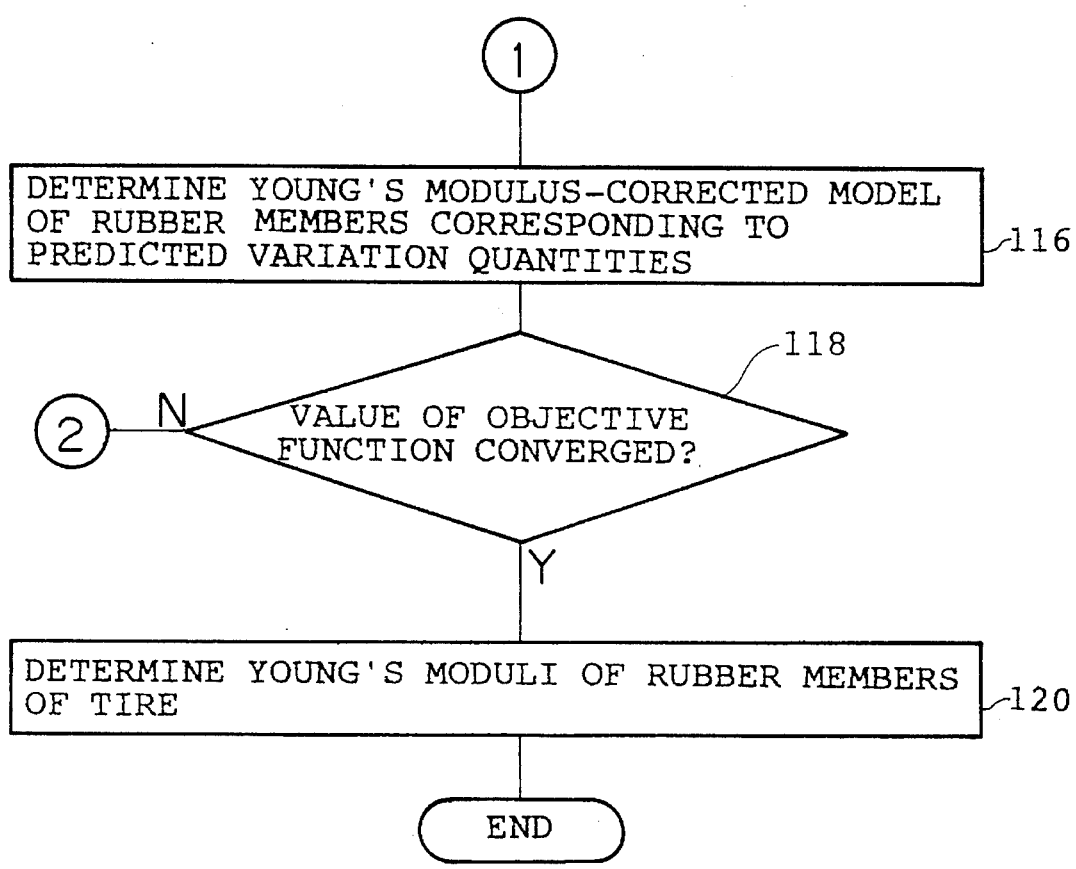

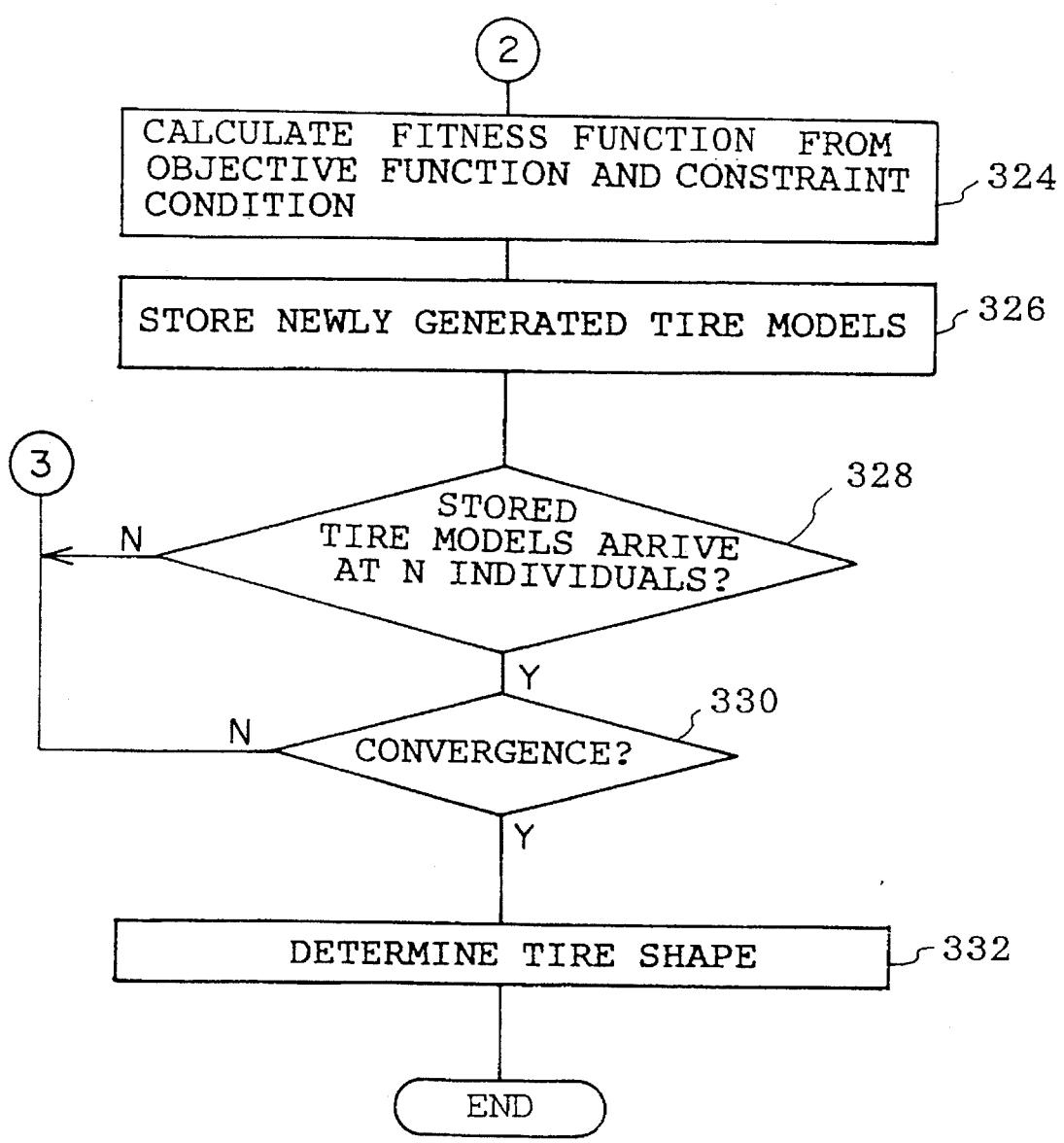

METHOD FOR DESIGNING PNEUMATIC TIRES

BACKGROUND OF THE INVENTION

1. Field of the Invention

The present invention relates to a method for designing pneumatic tires, and in particular relates to a method for designing pneumatic tires which provides efficient and easy design and development of the structure, shape and the like of tires for achieving single objective performance of tires, antinomic performance and the like, and is capable of determining the best structure and shape of tires and designing tires with high cost performance.

2. Related Art

Generally, as for a method for designing tires taking physical properties into consideration, design and development have been made in a conventional ordinary method such that a plurality of rubber members with known physical properties are set beforehand, the physical property is altered for each of the rubber members, a tire with an altered physical property is manufactured in trial and tested, and trials and tests are repeated until target performance is obtained for rolling resistance, spring constant and the like.

However, in the design and development of tires using the conventional design method, a target value was determined for certain performance, and achievement of this target value was once regarded as completion. There has been no concept that the best performance, that is most excellent in other words, is obtained by using given resources. Further, neither antinomic performance was designed, nor the best shape and structure were determined. Besides, any design method has had problems of extreme inefficiency and high cost because development is performed by repeating trial and error in the trial production and tests.

DISCLOSURE OF THE INVENTION

Thus an object of the present invention is to provide a method for designing pneumatic tires in which the best mode of a tire can be designed under given conditions, design and development of tires are made highly efficient, and tires can be provided at low cost, when it is intended to obtain a certain single performance or a plurality of antinomic performances.

In order to achieve the object described above, as a result of various investigations, the present inventor has noticed application of the "optimization design technique" utilized in a different field to a special field of the tire, tried investigations, and established a method for designing tires concretely considering physical properties. Concretely, the method for designing pneumatic tires according to the present invention comprises the steps of (a) determining a tire basic model for representing a tire cross-sectional shape including an internal structure, determining an objective function for representing a physical quantity for evaluation of tire performance, determining design variables for determining a physical property of rubber members and a physical property of reinforcing materials, and determining a constraint condition for constraining at least one of the physical property of the rubber members, the physical property of the reinforcing materials, the physical quantity for evaluation of performance, and a tire dimension degree; (b) determining values of the design variables for giving an optimum value of the objective function while considering the constraint condition; and (c) designing a tire on the basis of the design variables which give the optimum value of the objective function.

In the step (b); variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; and values of the design variables for giving the optimum value of the objective function can be determined while considering the constraint condition on the basis of the predicted values and the calculated values.

Further, as a result of various investigations, the present inventor has noticed application of the "genetic algorithm technique" utilized in a different field to the special field of the tire, tried all investigations, and concretely established it as a method for designing tires. Concretely, in said step (a); an object group for selection comprising a plurality of tire basic models for representing tire cross-sectional shapes including internal structures is determined; and an objective function for representing a physical quantity for evaluation of tire performance, design variables for determining a physical property of rubber members and a physical property of reinforcing materials, a constraint condition for constraining at least one of the physical property of the rubber members, the physical property of the reinforcing materials, the physical quantity for evaluation of performance and a tire dimension degree, and an adaptive function capable of being evaluated from the objective function and the constraint condition are determined for each of the tire basic models in the object group for selection; and in said step (b); two tire basic models are selected from said object group for selection on the basis of the adaptive function; at least one of generation of new tire basic models by interchanging the design variables of each of the tire basic models at a predetermined probability and generation of a new tire basic model by altering (mutating) a part of the design variables of at least one of the tire basic models is performed; an objective function, a constraint condition and an adaptive function are determined for the tire basic model with changed design variables; the concerned tire basic model and the tire basic model with the unchanged design variables are stored; repetition is made until providing a predetermined number of stored tire basic models; it is judged whether or not a new group comprising the predetermined number of stored basic models satisfies a predetermined convergence condition; if the convergence condition is not satisfied, the new group is regarded as said object group for selection to make repetition until the object group for selection satisfies the predetermined convergence condition; and if the predetermined convergence condition is satisfied, values of the design variables for giving the optimum value of the objective function are determined while considering the constraint condition among the predetermined number of stored tire basic models.

In the step (b); for the tire basic model with the changed design variables, variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; the adaptive function is determined from the value of the objective function and the value of the constraint condition; the concerned tire basic model and the tire basic model with the unchanged design variables are stored; and repetition can be made until providing a predetermined number of stored tire basic models.

Further, with respect to the design variables, at least one of Young's modulus or Poisson's ratio of the rubber, and Young's modulus or Poisson's ratio of the anisotropic reinforcing material in each direction can be used.

In the step (a) of the present invention, the tire basic model for representing the tire cross-sectional shape including the internal structure is determined, the objective function for representing the physical quantity for evaluation of tire performance is determined, the design variables for determining the physical property of the rubber members and the physical property of the reinforcing materials are determined, and the constraint condition for constraining at least one of the physical property of the rubber members, the physical property of the reinforcing materials, the physical quantity for evaluation of performance and the tire dimension degree is determined. It is recommended that the tire basic model is be divided into a plurality of elements. A physical quantity which governs superiority or inferiority of a tire such as rolling resistance and lateral spring constant may be used as the objective function for representing the physical quantity for evaluation of tire performance. Young's modulus and Poisson's ratio of each of the rubber members may be used for the design variables for determining the physical property of the rubber member of a tire. Constraint of the Young's modulus and the Poisson's ratio of the rubber member, constraint of a vertical spring constant of the tire, and constraint of upper and lower primary natural frequencies are exemplified for the constraint condition for constraining the rubber members of the tire and the arrangement of the rubber members. The objective function, the design variables and the constraint condition are not limited to the examples described above, which may be variously determined depending on an object of tire design.

In the nest step (b), values of the design variables for giving the optimum value of the objective function are determined while considering the constraint condition. The determination of values of the design variables includes determination of values of the design variables for giving an optimum value of the objective function while satisfying the constraint condition. In this case, it is effective that variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; and values of the design variables for giving the optimum value of the objective function are determined while considering the constraint condition on the basis of the predicted values and the calculated values. Thus the values of the design variables when the value of the objective function is optimum considering the constraint condition are determined.

Next in the step (c), the tire is designed by changing the tire basic model on the basis of the design variables for giving the optimum value of the objective function.

Further it is also effective that in said step (a); an object group for selection comprising a plurality of tire basic models for representing tire cross-sectional shapes including internal structures is determined; and an objective function for representing a physical quantity for evaluation of tire performance, design variables for determining a physical property of rubber members and a physical property of reinforcing materials, a constraint condition for constraining at least one of the physical property of the rubber members, the physical property of the reinforcing materials, the physical quantity for evaluation of performance and a tire dimension degree, and an adaptive function capable of being evaluated from the objective function and the constraint condition are determined for each of the tire basic models in the object group for selection; and in said step (b); two tire basic models are selected from said object group for selection on the basis of the adaptive function; at least one of generation of new tire basic models by interchanging the design variables of each of the tire basic models at a predetermined probability and generation of a new tire basic model by altering a part of the design variables of at least one of the tire basic models is performed; an objective function, a constraint condition and an adaptive function are determined for the tire basic model with changed design variables; the concerned tire basic model and the tire basic model with the unchanged design variables are stored; repetition is made until providing a predetermined number of stored tire basic models; it is judged whether or not a new group comprising the predetermined number of stored basic models satisfies a predetermined convergence condition; if the convergence condition is not satisfied, the new group is regarded as said object group for selection to make repetition until the object group for selection satisfies the predetermined convergence condition; and if the predetermined convergence condition is satisfied, values of the design variables for giving the optimum value of the objective function are determined while considering the constraint condition among the predetermined number of stored tire basic models. In this case, it is further effective that in said step (b); for the tire basic model with the changed design variables, variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; the adaptive function is determined from the value of the objective function and the value of the constraint condition; the concerned tire basic model and the tire basic model with the unchanged design variables are stored; and repetition is made until providing a predetermined number of stored tire basic models. Thus the values of the design variables when the value of the objective function is optimum considering the constraint condition are also determined. As the adaptive function capable of being evaluated from the objective function and the constraint condition, it is possible to use a function for determining the adaptive degree with respect to the tire model from the objective function and the constraint condition. In addition, the objective function, the design variables, the constraint condition and the adaptive function are not limited to the examples described above, which can be variously determined depending on an object of tire design. Further, for interchanging the design variables of the tire basic models described above, a method is available in which a part of design variables of two selected tire models or those at a predetermined site and followings thereof are exchanged. Furthermore, for altering a part of the design variables of the tire model, a method is available in which a design variable at a position determined by a previously determined probability is altered (mutated).

And in the step (c), the tire is designed by changing the tire basic model or the like on the basis of the design variables for giving the optimum value of the objective function.

When in the step (a) as described above; an object group for selection comprising a plurality of tire basic models for representing tire cross-sectional shapes including internal structures is determined; and an objective function for representing a physical quantity for evaluation of tire performance, design variables for determining a physical property of rubber members and reinforcing materials, a constraint condition for constraining at least one of the physical property of the rubber members and the reinforcing materials, the physical quantity for evaluation of performance and a tire dimension degree, and an adaptive function capable of being evaluated from the objective function and the constraint condition are determined for each of the tire basic models in the object group for selection; then the step (b) can be constituted by the following steps (1) to (4). These are (1) a step in which two tire basic models are selected from the object group for selection on the basis of the adaptive function; (2) a step in which at least one of generation of new tire basic models by interchanging the design variables of each of the tire basic models at a predetermined probability and generation of a new tire basic model by altering a part of the design variables of at least one of the tire basic models is performed; (3) a step in which an objective function, a constraint condition and an adaptive function are determined for the tire basic model with changed design variables by the interchange or alteration; the concerned tire basic model and the tire basic model with the unchanged design variables are stored; and the step (1) to the step (3) are repeated until providing a predetermined number of stored tire basic models; and (4) a step in which it is judged whether or not a new group comprising the predetermined number of stored basic models satisfies a predetermined convergence condition; if the convergence condition is not satisfied, the new group is regarded as the object group for selection to repeat the step (1) to the step (4) described above until the object group for selection satisfies the predetermined convergence condition; and if the predetermined convergence condition is satisfied, values of the design variables for giving the optimum value of the objective function are determined while considering the constraint condition among the predetermined number of stored tire basic models.

It is effective in the step (3) that for the tire basic model with the changed design variables, variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; the adaptive function is calculated from the value of the objective function and the value of the constraint condition; the new tire basic model with the changed design variables and the tire basic model with the unchanged design variables are stored; and the step (1) to the step (3) described above are repeated until providing a predetermined number of stored tire basic models. Thus the values of the design variables are also determined when the value of the objective function is optimum considering the constraint condition.

When design and development are performed on the basis of the design method according to the present invention, unlike conventional design and development based on trial and error, the computer calculation is principally used to make it possible not only to provide the best mode design but also to evaluate the performance of the designed tire to some extent, in which extreme effectiveness can be achieved, and the cost for the development can be reduced.

BRIEF DESCRIPTION OF THE DRAWINGS

FIG. 2A and FIG. 2B are flow charts showing a process routine of a first embodiment of the present invention.

FIG. 12A and FIG. 12B illustrate diagrams showing crest type mapping functions, wherein FIG. 12A is a diagram showing a continuous crest type mapping function, and FIG. 12B is a diagram showing a linear crest type mapping function.

FIG. 13A and FIG. 13B illustrate diagrams showing trough type mapping functions, wherein FIG. 13A is a diagram showing a continuous trough type mapping function, and FIG. 13B is a diagram showing a linear trough type mapping function.

FIG. 15A, FIG. 15B and FIG. 15C are flow charts showing processing routine of a fifth embodiment.

BEST MODE FOR CARRYING OUT THE INVENTION

Figure 1:
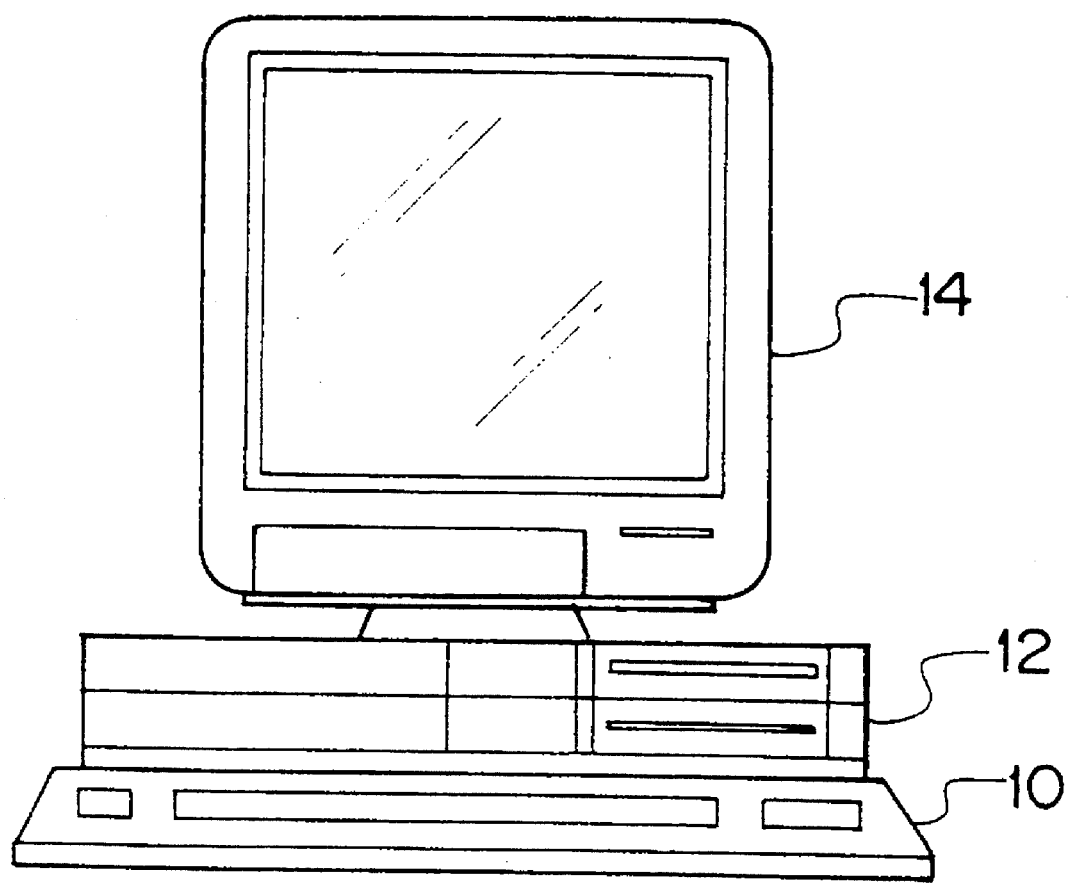
FIG. 1 is a schematic view of a personal computer to be used for embodiments of the present invention.

Embodiments of the present invention will be explained below in detail with reference to the drawings. FIG. 1 schematically shows a personal computer for carrying out the method for designing pneumatic tires according to the present invention. The personal computer comprises a keyboard 10 for inputting data and the like, a main computer body 12 for calculating design variables which satisfy a constraint condition and optimize, for example, maximize or minimize an objective function in accordance with a previously stored program, and a CRT 14 for displaying results of calculation by the main computer body 12.

At first, a first embodiment will be explained wherein Young's modulus as a physical property of each of rubber members for reducing rolling resistance without deteriorating durability of a bead portion is determined.

Upon the determination of Young's modulus, it is also preferable to determine Young's modulus as a physical property of each of rubber members for providing a minimum value as an optimum value of strain energy loss (hysteresis loss) of a tire in order to reduce rolling resistance.

FIG. 2 shows a processing routine of a program of the first embodiment. In a step 100, a tire cross-sectional shape in a natural equilibrium state is used as a reference shape, the reference shape is subjected to modeling by means of a technique such as a finite element method which can numerically and analytically determine a rolling resistance value during rolling with load, a tire cross-sectional shape including an internal structure is represented, and a tire basic model divided into a plurality of elements by mesh division is determined. The reference shape is not limited to the tire cross-sectional shape in the natural equilibrium state, and it may be an optional shape. The modeling is herein referred to numerical expression of tire shape, structure, materials and pattern in an input data format into a computer program prepared on the basis of a numerical and analytical technique.

Figure 3:
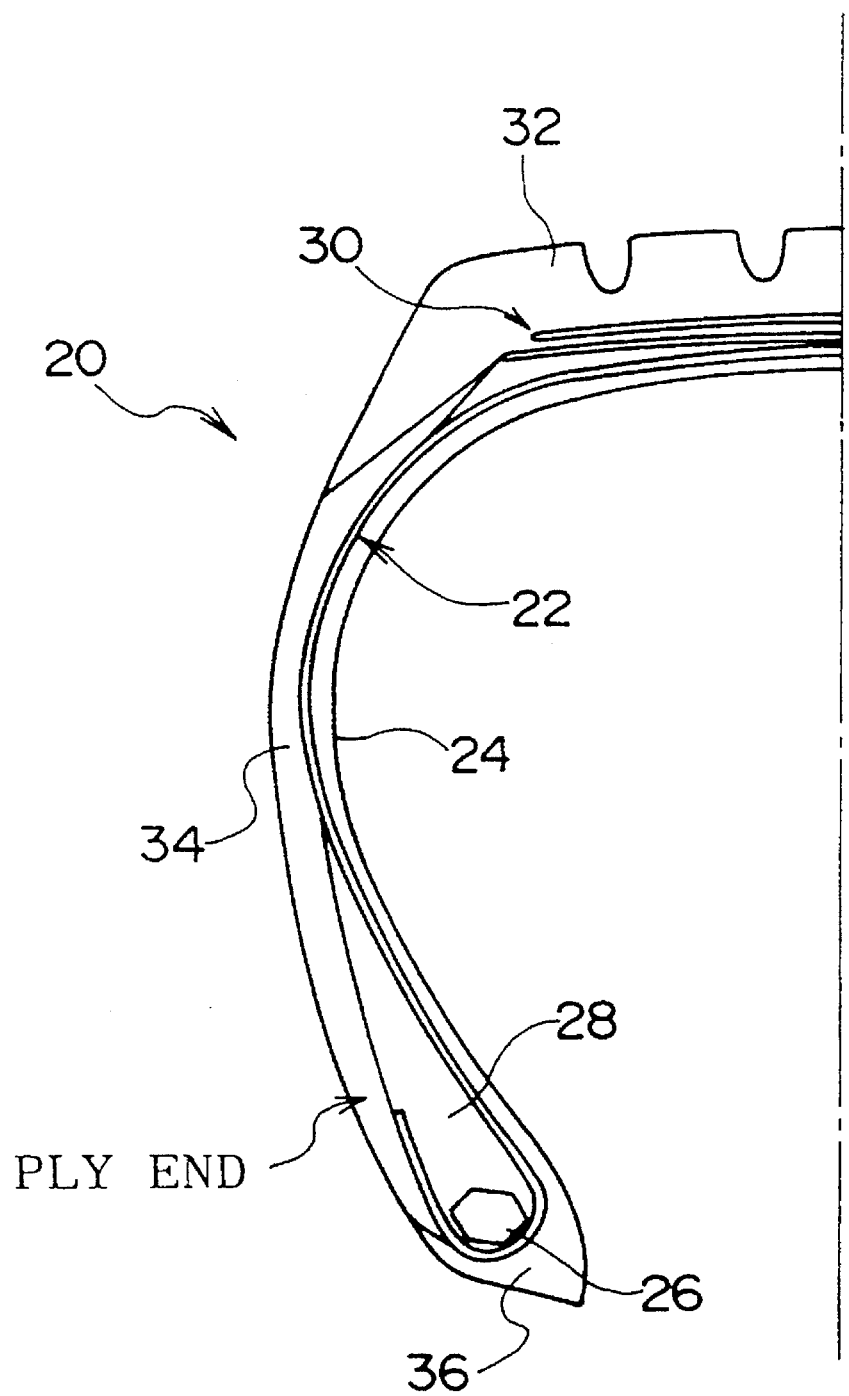
FIG. 3 is a diagram showing a tire basic model of the first embodiment.

FIG. 3 shows the tire basic model, illustrating a pneumatic tire 20 having a carcass 22 divided into a plurality of rubber members. The carcass 22 is folded around a bead 26. An inner liner 24 exists inside the carcass 22. Bead rubber 36 is arranged at a portion extended from the inner liner 24. An approximately triangular region formed by the folded carcass 22 is a bead filler 28. A belt 30 is arranged above the carcass 22. Tread rubber 32 formed with grooves is arranged radially outwardly outside the belt 30. Side rubber 34 is arranged in an axial direction outside the carcass 22. An example in which the tire basic model is divided into plural ones for each of the rubber members has been described, however, it is also acceptable to make division into optional shapes such as triangles depending on an object of design.

In the next step 102, an objective function for representing a physical quantity for evaluation of tire performance, a constraint condition for constraining a physical property of the rubber members, and design variables for determining the physical property of the rubber members are determined. In this embodiment, in order to design Young's modulus for reducing rolling resistance of the tire without deteriorating durability of the bead portion, the objective function OBJ and the constraint condition G are defined as follows.

Objective function OBJ: rolling resistance value

Constraint condition G: major strain under load at the ply end is within +3% of an initial structure.

In this embodiment, determination may be made according to a physical quantity relating to tire performance, for example, as one for ensuring constant vertical spring (resiliency) while increasing lateral rigidity during cornering.

The design variables for determining the physical property of rubber members are allowed to correspond to coefficients for determining Young's moduli represented by the following equation (1), so as to be changeable within ranges predetermined from Young's moduli of the rubber members in the tire basic model. The coefficients for determining Young's moduli are set to increase or decrease by predetermined increments or decrements previously determined in order as coefficients $r_1, r_2, r_3, \ldots$ (represented by a general formula $r_i$ below, wherein, $i=1, 2, \ldots$, predetermined natural number) to vary the Young's moduli. The coefficient $r_i$, when a Young's modulus of a rubber member in the tire basic model is multiplied by the coefficient to obtain a Young's modulus of the rubber member, is set as the design variable.

$$e_i = r_i \cdot e_0 \qquad (1)$$

wherein, $e_i$: Young's modulus, $r_i$: coefficient, $e_0$: Young's modulus of a rubber member in the tire basic model.

Figure 2A:
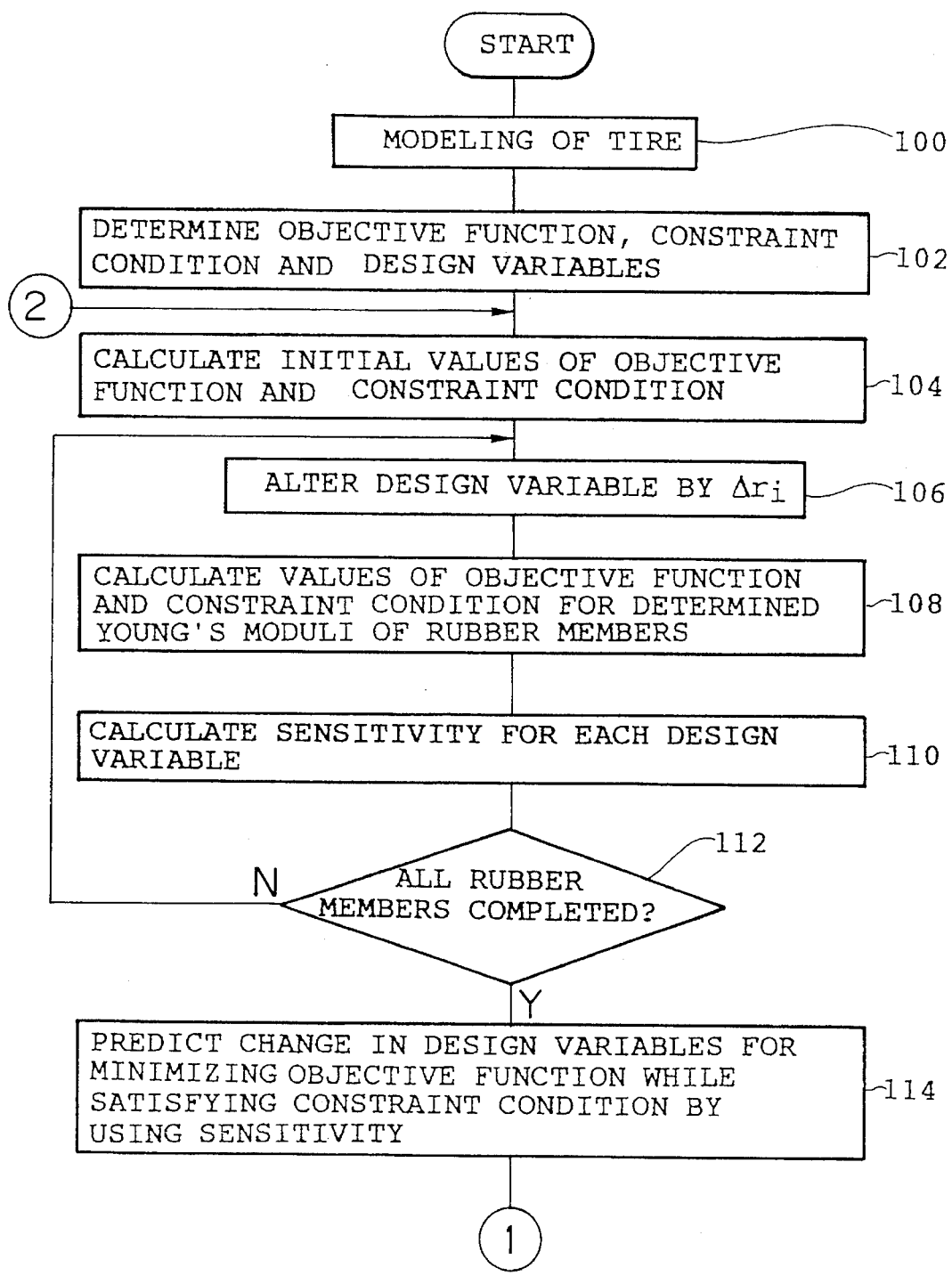

After determining the objective function OBJ, the constraint condition G, and the design variables $r_i$ as described above, an initial value $OBJ_0$ of the objective function OBJ and an initial value $G_0$ of the constraint condition G are calculated for an initial value $r_0$ of the design variables $r_i$ (for example, a value for obtaining a Young's modulus of a rubber member in the tire basic model, 1) in a step 104 in FIG. 2A and 2B.

In the next step 106, the design variable $r_i$ of a predetermined rubber member is respectively altered by $Dr_i$ to change the physical property of the tire basic model.

In a step 108, a value of the objective function $OBJ_i$ and a value of the constraint condition $G_i$ after altering the design variable by $\Delta r_i$ are calculated. In a step 112, a sensitivity $dOBJ/dr_i$ of the objective function as a ratio of a variation quantity of the objective function to a unit variation quantity of the design variable and a sensitivity $dG/dr_i$ of the constraint condition as a ratio of a variation quantity of the constraint condition to the unit variation amount of the design variable are calculated for each of the design variables in accordance with the following equations (2) and (3).

$$\begin{aligned} dOBJ/dr_i &= [OBJ_i - OBJ_0]/\Delta r_i \qquad (2) \\ &= [OBJ(r_i + \Delta r_i) - OBJ(r_i)]/[(r_i + \Delta r_i) - (r_i)] \end{aligned}$$

$$dG/dr_i = [G_i - G_0]/\Delta r_i \qquad (3)$$

According to the sensitivities, it is possible to predict the degree of change in the value of the objective function when the design variable is altered by $\Delta r_i$.

In the next step 112, it is judged whether or not calculation has been completed for all of the rubber members. If calculation has not been completed for all of the rubber members, the step 106 to the step 112 are repeated and executed.

In the next step 114, variation quantities of the design variables for minimizing the objective function while satisfying the constraint condition are predicted by means of a mathematical programming method by using the initial value $OBJ_0$ of the objective function, the initial value $G_0$ of the constraint condition, the initial value $r_0$ of the design variables and the sensitivities. In a step 116, by using the predicted values of the design variables, a Young's modulus-corrected model, in which the Young's modulus of each of the rubber members has been corrected although the structures of the rubber members for constituting the tire are unchanged, is determined, and a value of the objective function is calculated. In a step 118, it is judged whether or not the value of the objective function has converged by comparing a previously inputted threshold value with a difference between the value of the objective function OBJ calculated in the step 116 and the initial value $OBJ_0$ of the objective function calculated in the step 104. If the value of the objective function has not converged, the design variable values determined in the step 114 are regarded as initial values, and the step 104 to the step 118 are repeated and executed. If it is judged that the value of the objective function has converged, the values of the design variables at this time are regarded as values of the design variables for minimizing the objective function while satisfying the constraint condition, and the values of the design variables are used in a step 120 to determine the Young's modulus of each of the rubber members for constituting the tire.

Next, a second embodiment of the present invention will be explained. In this embodiment, upon determination of Young's modulus, in order to improve durability of a bead portion without deteriorating durability of a belt, Young's modulus of each of rubber elements including an arrangement of rubber members is determined, wherein an objective function OBJ and a constraint condition G are determined as follows.

Objective function OBJ: major strain under load at the ply end

Constraint condition G: value of shearing strain between layers under load at the belt end is within +3% of an initial structure.

In this embodiment, no difference value as in the embodiment described above is used as the sensitivity, but the sensitivity is analytically calculated according to a differentiated value explained below. Namely, a well-known rigidity equation (4) shown below is used for a continuous body as a tire to determine a behavior of the continuous body (tire) by means of the finite element method or the like. The rigidity equation (4) is partially differentiated by Young's modulus (see equation (5) below), thereby the sensitivity to strain can be determined as shown below.

$$F = K \cdot U \tag{4}$$

wherein, F: external force vector, K: rigidity matrix, U: displacement vector.

$$\partial F / \partial e_{ij} = [\partial K / \partial e_{ij}] \cdot U + K \cdot [\partial U / \partial e_{ij}] \tag{5}$$

wherein, $\partial e_{ij}$: Young's modulus of the j-th rubber element of the i-th rubber member.

The external force F does not change herein even if the Young's modulus $e_{ij}$ changes. Thus upon definition of $\partial F/\partial e_{ij}=0$, the equation described above is represented by the following equation (6).

$$\partial U / \partial e_{ij} = -K^{-1} \cdot [\partial K / \partial e_{ij}] \cdot U \tag{6}$$

This equation represents the sensitivity to displacement. As well-known, the strain vector $\epsilon$ may be represented by $\epsilon = B \cdot U$. Therefore, the sensitivity to strain may be represented by the following equation (7).

$$\partial \epsilon / \partial e_{ij} = B \cdot [\partial U / \partial e_{ij}] \tag{7}$$

wherein, B: displacement-strain matrix.

An example has been explained in which the rubber member for constituting the tire is divided into a plurality of rubber elements, however, rubber elements obtained by simply dividing the entire tire may be used to perform calculation.

Figure 4:
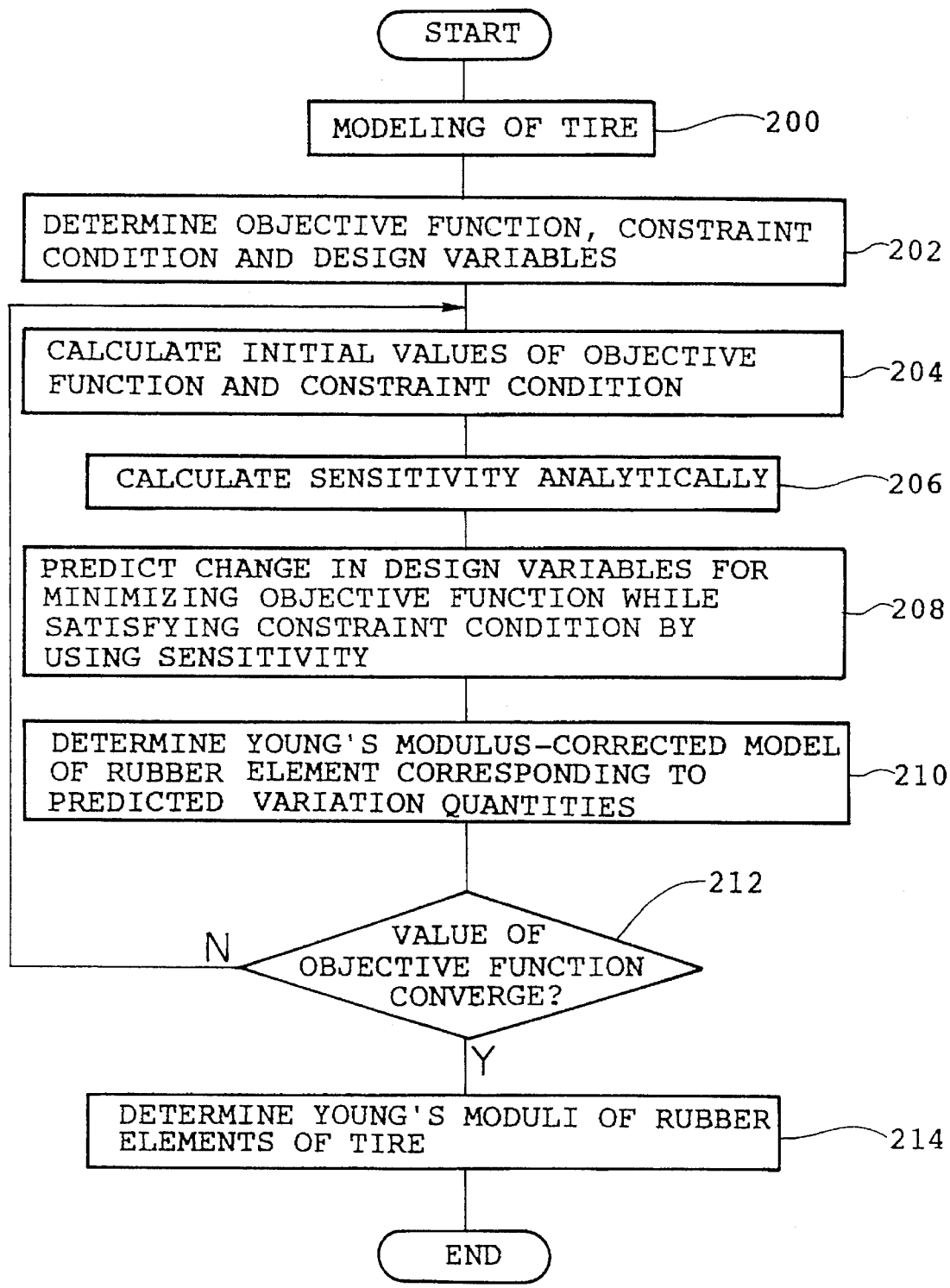
FIG. 4 is a flow chart showing a processing routine of a second embodiment of the present invention.
Figure 5:
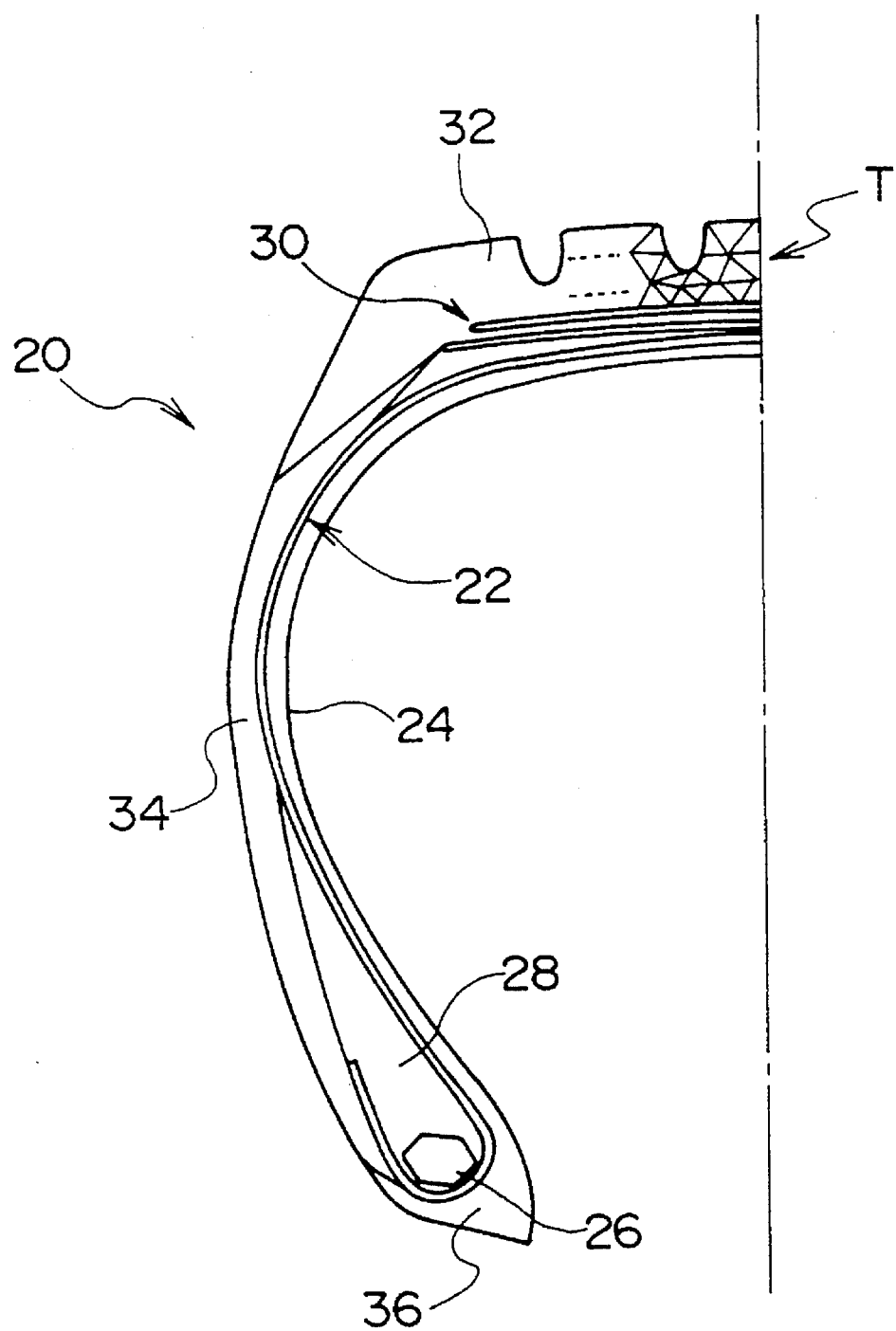
FIG. 5 is a diagram showing a tire basic model of the second embodiment.

In a step 200 in FIG. 4, a tire cross-sectional shape in a natural equilibrium state is used as a reference shape, the reference shape is subjected to modeling by means of a technique such as a finite element method which can numerically and analytically determine strain by rubber members or the like for constituting a tire under load, a tire cross-sectional shape including an internal structure is represented, and a tire basic model divided into a plurality of elements by mesh division is also determined for each of the rubber members. In a tire basic model shown in FIG. 5, for example, tread rubber 32 arranged over a belt 30 are divided into each of a plurality of rubber elements (a part of which is shown by a symbol T in FIG. 5).

An example has been described in which the tire basic model is divided for each of the rubber members into plural ones, however, the division element is not limited to the rubber member, which may include a carcass and a bead wire.

In the next step 202, an objective function for representing a physical quantity for evaluation of tire performance, a constraint condition, and design variables for determining the physical property of each of the rubber elements of the rubber members are determined. In this embodiment, the objective function OBJ and the constraint condition G are defined as described above.

The design variables for determining the physical property of each of the rubber elements of the rubber members are allowed to correspond to coefficients for determining Young's moduli represented by the following equation (8), so as to be changeable within the range predetermined from Young's moduli of the rubber members in the tire basic model. The coefficients for determining the Young's moduli are set to increase or decrease by predetermined increments or decrements previously determined in order as coefficients $r_{i1}, r_{i2}, r_{i3}, \ldots$ (represented by a general formula $r_{ij}$ below, wherein, i=numerical value for representing the rubber member, j=1, 2, ..., predetermined natural number) to vary the Young's moduli. The coefficient $r_{ij}$, when the Young's modulus of a rubber element in the tire basic model is multiplied by the coefficient to obtain a Young's modulus of the rubber member, is set as the design variable.

$$e_{ij} = r_{ij} \cdot e_{i0} \tag{8}$$

wherein, $e_{ij}$: Young's modulus of the j-th rubber element of the i-th rubber member, $r_{ij}$: coefficient, $e_{i0}$: Young's modulus of the i-th rubber member in the tire basic model.

After determining the objective function OBJ, the constraint condition G, and the design variables $r_{ij}$ as described above, an initial value $OBJ_0$ of the objective function OBJ and an initial value $G_0$ of the constraint condition G are calculated for an initial value $r_0$ of the design variables $r_{1j}$ (for example, 1) in a step 204 in FIG. 4.

Figure 6:
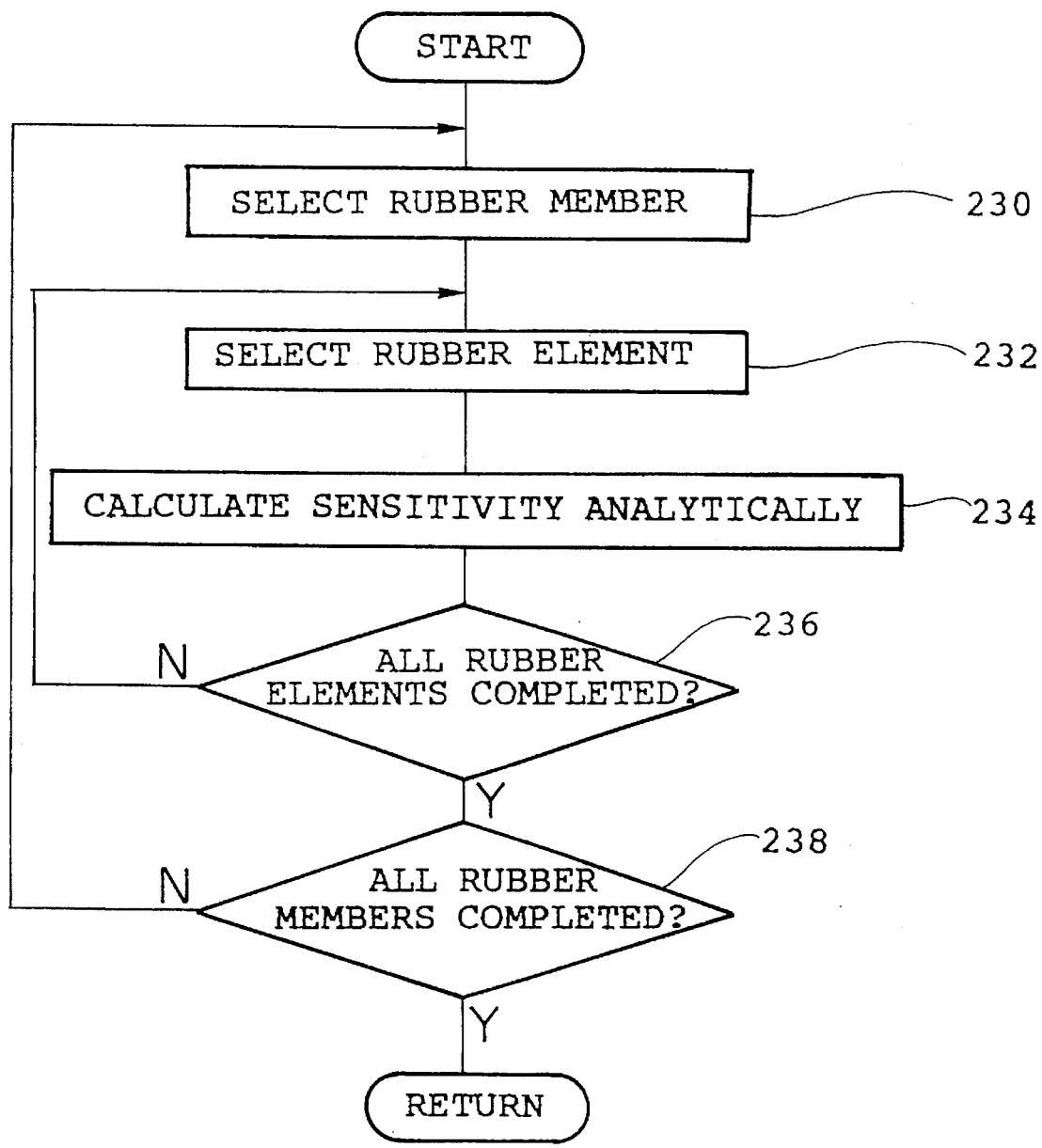
FIG. 6 is a flow chart showing a routine for determining a sensitivity in the second embodiment.

In the next step 206, in order to change the physical property of the tire basic model, a sensitivity $\partial \epsilon / \partial e_{ij}$ in a predetermined rubber member is analytically determined by using the equation (7) described above. Namely, in the sensitivity calculation, a certain rubber member is selected in a step 230 in FIG. 6, and a rubber element in this rubber member is selected in a step 232. In a step 234, the sensitivity $\partial \epsilon / \partial e_{ij}$ of the selected rubber element is analytically determined by using the equation (7) described above.

In the next step 236, it is judged for the same rubber member whether or not the sensitivity calculation has been completed for all of the rubber elements. If it has not been completed for all of the rubber elements, the step 232 to the step 236 are repeated and executed. As understood also from the equation (6) described above, in the sensitivity calculation for each of the rubber elements of the same rubber member, $K^{-1}$ having large calculation load may be determined once in the calculation by means of the infinite element method. Thus the calculation load is relieved. In the next step 238, it is judged whether or not the sensitivity calculation has been completed for all of the rubber elements. If it has not been completed for all of the rubber members, the step 230 to the step 238 are repeated and executed.

By using the sensitivity, it is possible to predict the degree of change in the value of the objective function when the design variables are changed.

In the next step 208, variation quantities of the design variables for minimizing the objective function while satisfying the constraint condition are predicted by means of a mathematical programming method by using the initial value $OBJ_0$ of the objective function, the initial value $G_0$ of the constraint condition, the initial value $r_0$ of the design variables and the sensitivities. In a step 210, by using the predicted values of the design variables, a Young's modulus-corrected model, in which the Young's modulus of each of the rubber elements for constituting each of the rubber members has been corrected although the external structure of the tire is unchanged, is determined, and a value of the objective function is calculated. In the next step 212, it is judged whether or not the value of the objective function has converged by comparing a previously inputted threshold value with a difference between the value of the objective function OBJ calculated in the step 210 and the initial value $OBJ_0$ of the objective function calculated in the step 204. If the value of the objective function has not converged, the design variable value determined in the step 210 is regarded as an initial value, and the step 204 to the step 212 are repeated and executed. If it is judged that the value of the objective function has converged, the values of the design variables at this time are regarded as values of the design variables for minimizing the objective function while satisfying the constraint condition, and the values of the design variables are used in a step 214 to determine the Young's modulus of the rubber elements of each of the rubber members for constituting the tire.

Tires obtained in the first and second embodiments described above were actually manufactured in trial, and tests were performed. Results are shown in the following Table 1.

TABLE 1

|  | Conventional tire | First embodiment | Second embodiment |
| --- | --- | --- | --- |
| Required time for design and development | 100 | 65 | 70 |
| Rolling resistance value | 100 | 79 | — |
| Major strain at ply end | 100 | 102 | 70 |
| Major strain at belt end | 100 | — | 101 |

Note:
tire size: TBR295/75R22.5
internal pressure: 7.15 kg/cm²
load: 2500 kgf

In the embodiment described above, the Young's modulus was determined as the physical property of the rubber member to reduce the rolling resistance, however, the present invention is not limited thereto, and Poisson's ratio may be determined. Further, there is no limitation to the physical property of the rubber member. The present invention may be applied so as to optimize Young's modulus or Poisson's ratio of a steel cord or the like. Further, when the present invention is applied to a vibration system, a spring constant may be determined.

Next, a third embodiment will be explained in which an arrangement of rubber members is designed genetically by an algorithm using a plurality types of rubber capable of being used. This embodiment has approximately the same constitution as the embodiment described above. Thus the same portions are designated by the same symbols, and detailed explanation is omitted.

Figure 7A:
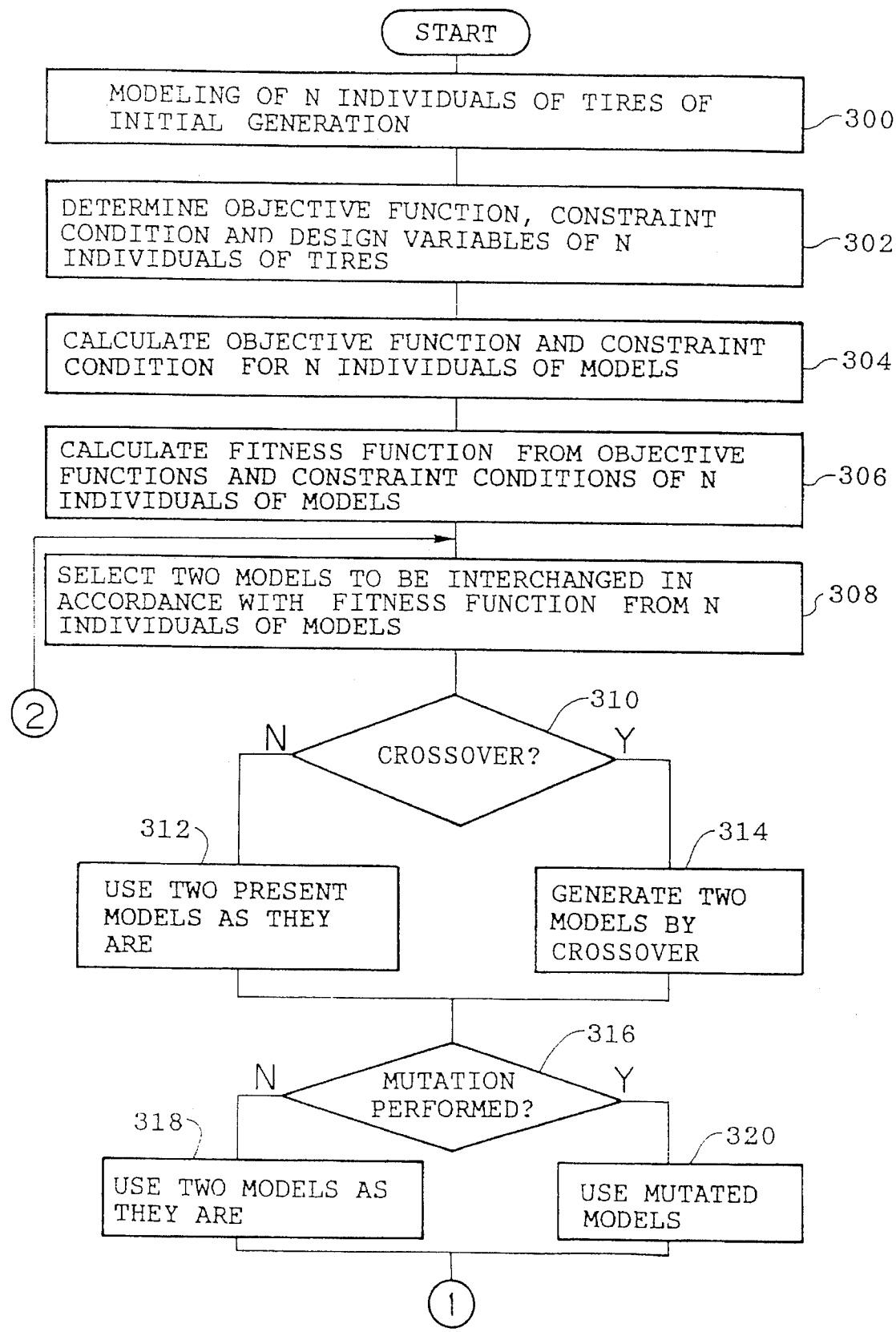
FIG. 7A and FIG. 7B are flow charts showing a processing routine of a third embodiment.
Figure 7B:
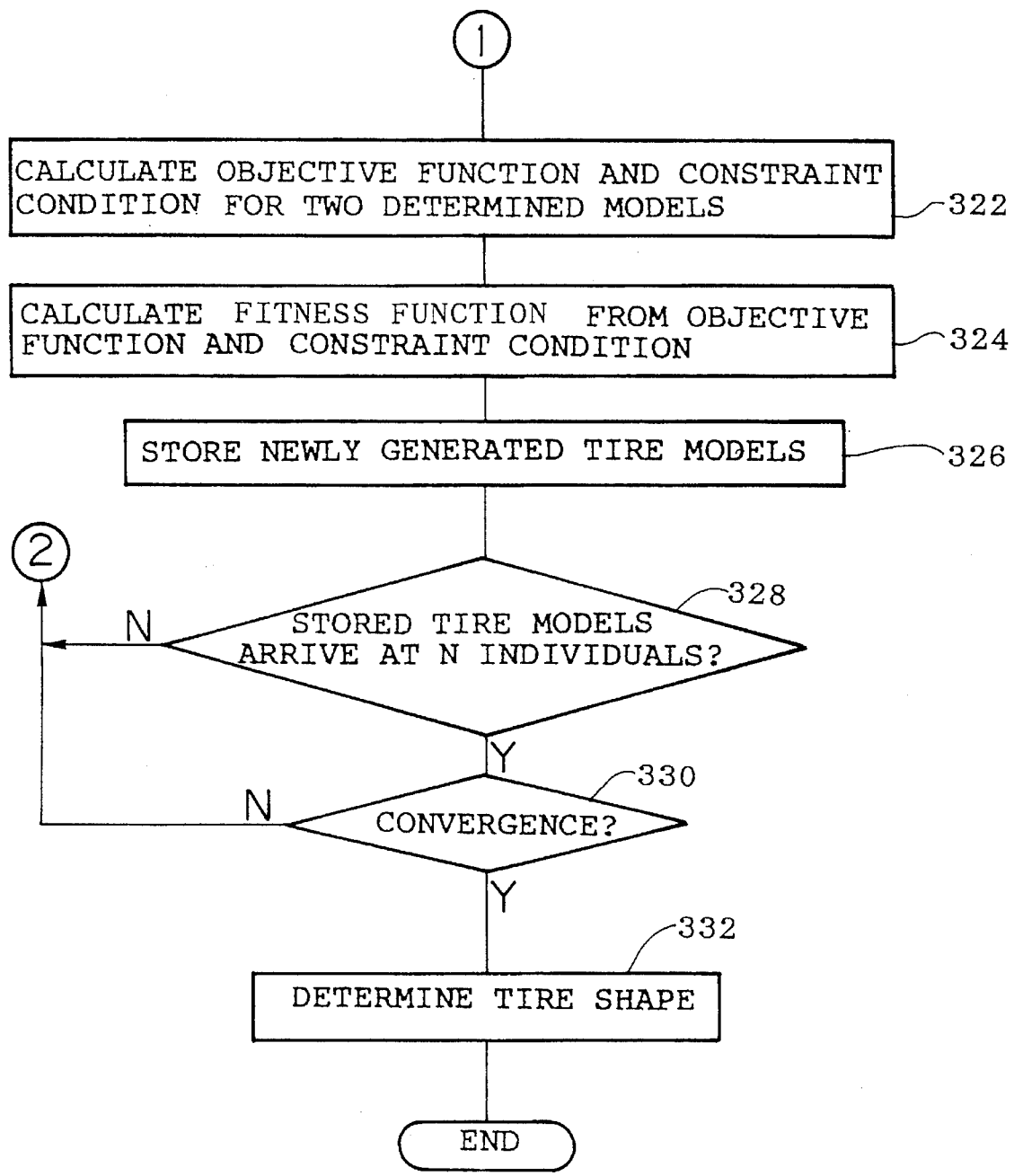

FIG. 7A and FIG. 7B show a processing routine of a program of the third embodiment. In a step 300, tire cross-sectional shapes having N individuals of different internal structures are subjected to modeling by means of a technique such as a finite element method in which strain at a ply end under load can be numerically and analytically determined, and tire basic models including internal structures are determined. The modeling is herein referred to numerical expression of tire shape, structure, materials and pattern in an input data format into a computer program prepared on the basis of a numerical and analytical technique. N is inputted by a user beforehand.

Figure 8:
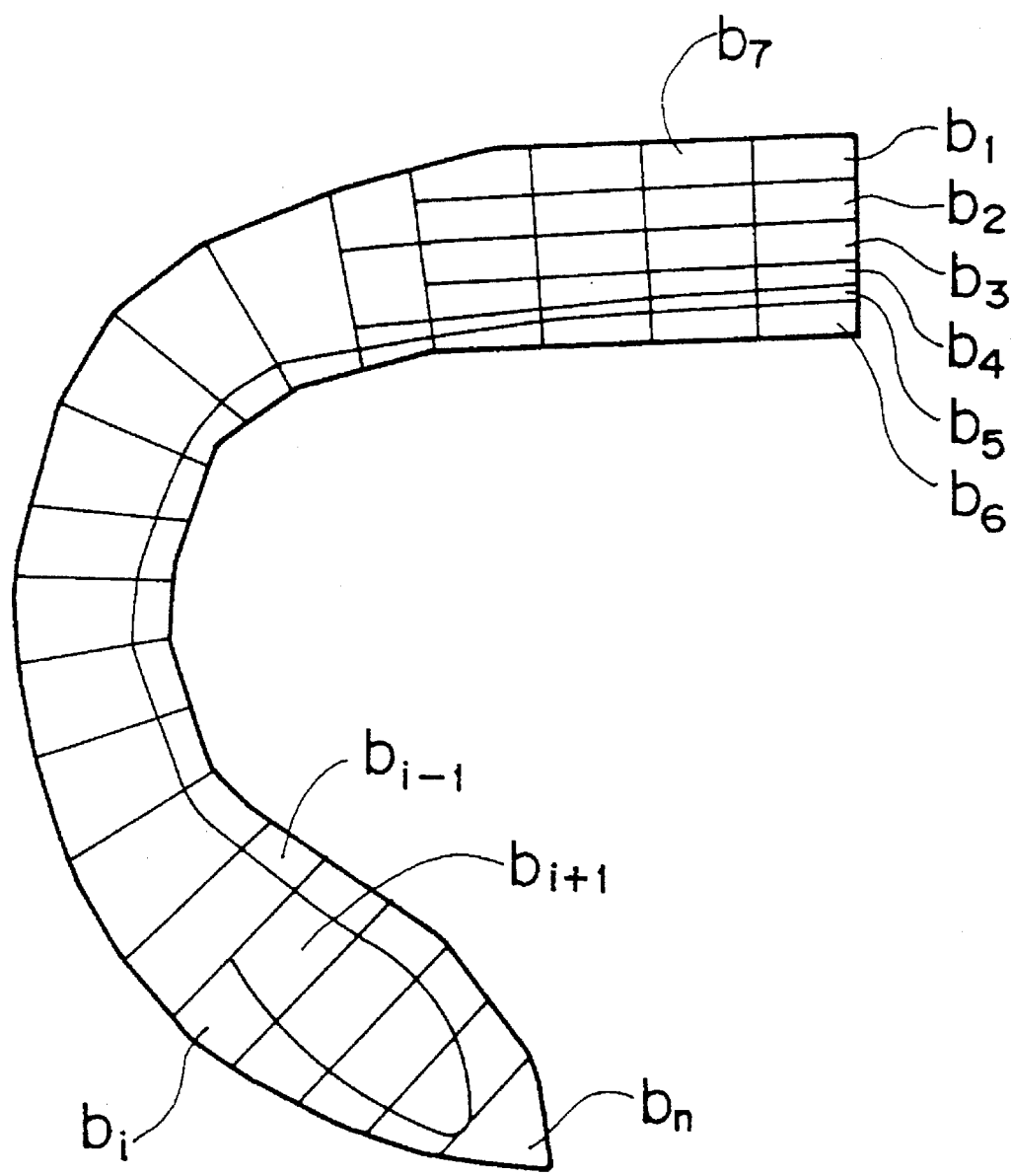
FIG. 8 is a diagram showing a tire basic model of the third embodiment.

In this embodiment, the design variables are sites $b_1$, $b_2$, ..., $b_i$, ..., $b_n$ having possibility to alter the Young's modulus of the rubber when a tire basic model as shown in FIG. 8 is prepared. It is approved in this embodiment that four types of rubber having different Young's moduli can be used for simplification of explanation, with a [relation] described below. The relation is summarized and shown in the following Table 2.

[Relation]

If design variable $b_i=1_{(10)}=00_{(2)}$, then Young's modulus e=0.15.

If design variable $b_i=2_{(10)}=01_{(2)}$, then Young's modulus e=0.18.

If design variable $b_i=3_{(10)}=10_{(2)}$, then Young's modulus e=0.22.

If design variable $b_i=4_{(10)}=11_{(2)}$, then Young's modulus e=0.31.

TABLE 2

| Design variable $b_i$ | | Value of Young's |
| --- | --- | --- |
| Decimal number | Binary number | modulus (e) |
| 1 | 00 | 0.15 |
| 2 | 01 | 0.18 |
| 3 | 10 | 0.22 |
| 4 | 11 | 0.31 |

In the next step 302, an objective function for representing a physical quantity for evaluation of tire performance, a constraint condition for constraining the physical property of each of rubber elements of the rubber member, and design variables for determining internal structures of N individuals of tire models are determined. In this embodiment, the objective function OBJ and the constraint condition G are defined as follows to improve durability of the bead.

Objective function OBJ: major strain under load at the ply end

Constraint condition G: the number of rubber members is not more than 5.

With respect to the number of rubber members described above, one member is referred to if materials of mutually adjoining elements are the same.

Next, in a step 304, each of the objective functions $OBJ_J$ and the constraint conditions $G_J$ is calculated for each of the design variables $b_{iJ}$ (J=1, 2, ..., N) of N individuals of the tire models.

In the next step 306, each of adaptive functions $F_J$ of N individuals of the tire models is calculated in accordance with the following equation (9) by using each of the objective functions $OBJ_J$ and the constraint conditions $G_J$ of N individuals of the tire models determined in the step 304. In this embodiment, for example, the major strain at the ply end is minimized, so that the value in accordance with the adaptive function (adaptive degree) becomes larger as the major strain at the ply end becomes smaller.

$$\Phi_J = OBJ_J + \gamma \cdot max(G_J, 0)$$

$$F_J = 1/\Phi_J \qquad (9)$$

or $$F_J = -\Phi_J$$

or $$F_J = -a \cdot \Phi_J + b$$

wherein, $$a = [\Phi_{avg}(c-1)]/[(\Phi_{avg} - \Phi_{min})]$$

$$b = [\Phi_{avg}(c - \Phi_{min})]/[(\Phi_{avg} - \Phi_{min})]$$

$$\Phi_{avg} = \left[ \sum_{J=1}^{N} \Phi_J \right] / N$$

c: constant, $\gamma$: penalty coefficient $$\Phi_{min} = min(\Phi_1, \Phi_2, \ldots \Phi_N)$$

$\Phi_J$=penalty function of the J-th tire model of N individuals of tire models (J=1,2,3, ... N)

wherein, c and $\gamma$ are inputted by a user beforehand.

In the next step 308, two models to be interchanged are selected from N individuals of the models. A generally known adaptive degree proportion strategy is used as a selection method. A probability $P_u$ to select a certain individual (u) of N individuals of the tire models respectively in selection is represented by the following equation (10).

$$P_u = F_u / \left[ \sum_{J=1}^{N} F_J \right] \qquad (10)$$

wherein, $F_u$: adaptive function of a certain individual (u) in N individuals of the tire models $F_J$: J-th adaptive function of N individuals of the tire models (J=1,2,3, ... N)

In the embodiment described above, the adaptive degree proportion strategy has been used as the selection method. Besides, it is acceptable to use the expectation strategy, rank strategy, elite storage strategy, tournament selection strategy, or GENITOR algorithm as described in "Genetic Algorithm" (edited by Hiroaki KITANO).

In the next step 310, it is determined whether or not the two selected tire models are interchanged with a probability T inputted by a user beforehand. By the interchange referred to herein is meant exchange of a part of elements of the two tire models. If no interchange is performed under a negative judgment, the present two tire models are allowed to remain in a state as they are in a step 312 to proceed to a step 316.

On the other hand, if interchange is performed under an affirmative judgment, the two tire models are interchanged in a step 314 as described below.

Figure 9:
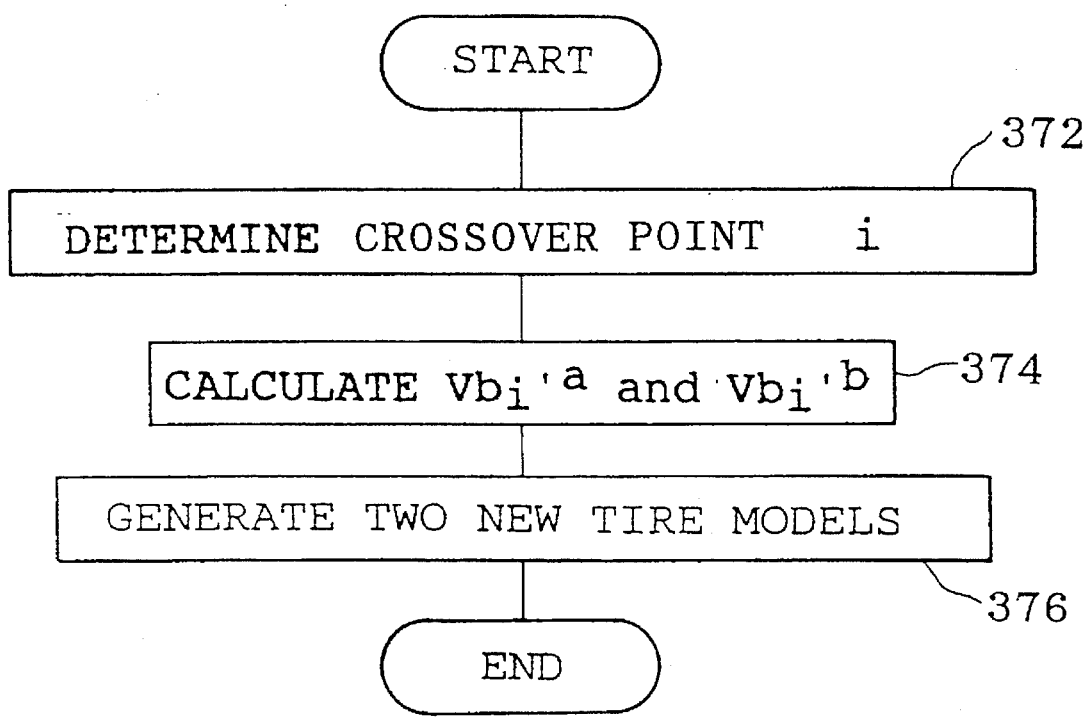
FIG. 9 is a flow chart showing an interchange processing routine of the third embodiment.

The interchange of the two tire models is performed in accordance with an interchange routine shown in FIG. 9. Upon execution of the interchange routine, the two tire models selected in the step 308 described above are firstly regarded as a tire model (a) and a tire model (b). Expression is made with design variable vectors including arrays for design variables of each of the tire models (a) and (b). A design variable vector of the tire model (a) is $Vb^a$, and a design variable vector of the tire model (b) is $Vb^b$ as shown as follows.

$$Vb^a = (b_1^a, b_2^a, \ldots, b_{i-1}^a, b_i^a, b_{i+1}^a, \ldots, b_{n-1}^a, b_n^a)$$

$$Vb^b = (b_1^b, b_2^b, \ldots, b_{i-1}^b, b_i^b, b_{i+1}^b, \ldots, b_{n-1}^b, b_n^b)$$

[Expression by binary numbers]

$$Vb^a = (01, 00, \ldots, 01, 00, 11, \ldots, \ldots, 11)$$

$$Vb^b = (11, 00, \ldots, 11, 11, 10, \ldots, \ldots, 10)$$

[Expression by decimal numbers]

$$Vb^a = (2, 1, \ldots, 2, 1, 4, \ldots, \ldots, 4)$$

$$Vb^b = (4, 1, \ldots, 4, 4, 3, \ldots, \ldots, 3)$$

Random numbers are generated in a step 372 in FIG. 9, and an interchange place i is determined in accordance with generated random numbers. In the next step 374, the arrays of design variables as the design variable vectors are altered as follows, and design variable vectors $Vb^{a'}$ and $Vb^{b'}$ are determined as new arrays of design variables.

[Expression by binary numbers]

$$b_1^a, b_2^a, \ldots, b_{i-1}^a, \qquad b_i^a \qquad , b_{i+1}^a, \ldots, b_n^a)$$
$$Vb^a = (01, 00, \ldots, 01, 0 \rightarrow \quad \searrow 0, 11, \ldots, 11)$$
$$Vb^b = (11, 00, \ldots, 11, 1 \rightarrow \quad \nearrow 1, 10, \ldots, 10)$$
$$b_1^b, b_2^b, \ldots, b_{i-1}^b, \qquad b_i^b \qquad , b_{i+1}^b, \ldots, b_n^b)$$

The interchange is performed between $b_i^a$ and $b_i^b$ as indicated above. Namely:

$$b_1^a, b_2^a, \ldots, b_{i-1}^a, \quad b_i^a \quad , b_{i+1}^a, \ldots, b_n^a)$$
$$Vb^{a'} = (01, 00, \ldots, 01, \quad 01, \quad 10, \ldots, 10)$$
$$Vb^{b'} = (11, 00, \ldots, 11, \quad 10, \quad 11, \ldots, 11)$$
$$b_1^b, b_2^b, \ldots, b_{i-1}^b, \quad b_i^b \quad , b_{i+1}^b, \ldots, b_n^b)$$
$$Vb^a(b_i^a) \rightarrow Vb^{a'}(b_i^a) = 01$$
$$Vb^b(b_i^b) \rightarrow Vb^{b'}(b_i^b) = 10$$

[Expression by decimal numbers]

$$b_1^a, b_2^a, \ldots, b_{i-1}^a: \quad b_i^a \quad , b_{i+1}^a, \ldots, b_n^a)$$
$$Vb^a = (2, 1, \ldots, 2 \rightarrow \quad \searrow 1, 4, \ldots, 4)$$
$$Vb^b = (4, 1, \ldots, 4 \rightarrow \quad \nearrow 4, 3, \ldots, 3)$$
$$b_1^b, b_2^b, \ldots, b_{i-1}^b: \quad b_i^b \quad , b_{i+1}^b, \ldots, b_n^b)$$

The interchange is performed between i and (i−1) as indicated above. Namely:

$$b_1^a, b_2^a, \ldots, b_{i-1}^a, \quad b_i^a, b_{i+1}^a, \ldots, b_n^a)$$
$$Vb^{a'} = (\ 2,\ 1, \ldots,\ 2,\quad 4,\ 3, \ldots,\ 3\ )$$
$$Vb^{b'} = (\ 4,\ 1, \ldots,\ 4,\quad 1,\ 4, \ldots,\ 4\ )$$
$$b_1^b, b_2^b, \ldots, b_{i-1}^b, \quad b_i^b, b_{i+1}^b, \ldots, b_n^b)$$

In the next step 376, two new tire models are generated in accordance with the determined design variable vectors $Vb^{a'}$ and $Vb^{b'}$.

The interchange place i is one in this embodiment. Besides, the plural points interchange or the uniform interchange may be used as described in "Genetic Algorithm" (edited by Hiroaki KITANO).

Figure 10:
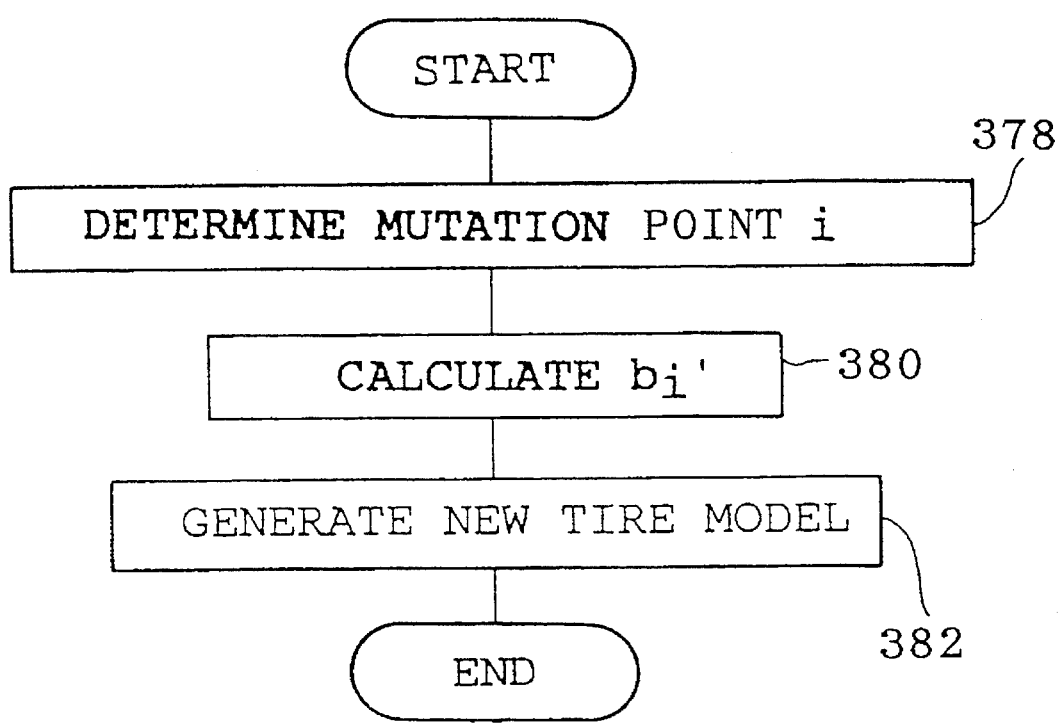
FIG. 10 is a flow chart showing a mutation processing routine of the third embodiment.

Next, the mutation is carried out on the basis of a processing routine shown in FIG. 10. The array of the design variables of the tire basic model is represented by a design variable vector:

$$Vb = (b_1, b_2, \ldots b_{i-1}, b_i, b_{i+1}, \ldots b_n)$$

Random numbers are generated in a step 378, and a place i of mutation is determined in accordance with the random numbers. In the next step 380, the design variable $b_i$ at the place i of mutation is altered as follows, and a design variable vector Vb' is generated as a new array of design variables.

If $b_i=0$, then $b_i'=1$.
If $b_i=1$, then $b_i'=0$.

$$Vb' = (b_1, b_2, \ldots b_{i-1}, b_i', b_{i+1}, \ldots b_n)$$

In the next step 382, a new tire model is generated from the determined design variable vector Vb'.

Thus a value of the objective function and a value of the constraint condition are calculated in a step 322 in FIG. 7B for newly generated two tire models. In the next step 324, an adaptive function is calculated by using the equation (9) in the same manner as the embodiment described above according to the obtained values of the objective function and the constraint condition.

In the next step 326, the two tire models described above are stored. In the next step 328, it is judged whether or not the number of tire models stored in the step 326 arrives at N individuals. If it does not arrive at N individuals, the step 308 to the step 328 are repeated and executed until providing N individuals. On the other hand, if the number of tire models arrives at N individuals, a convergence judgment is made in a step 330. If there is no convergence, N individuals of the tire models are renewed into the tire models stored in the step 326, and the step 308 to the step 330 are repeated and executed. On the other hand, if a judgment of convergence is made in the step 330, values of design variables of a tire model, which maximize the value of the objective function while approximately satisfying the constraint condition among N individuals of the tire models, are regarded as values of design variables for maximizing the objective function while approximately satisfying the constraint condition, and in a step 332, Young's modulus of each of the rubber members for constituting the tire is determined by using the values of design variables.

In the judgment of convergence in the step 330, it is regarded that convergence is achieved if any of the following conditions is satisfied:

1) the number of generations arrives at M individuals;
2) the number of line columns having the smallest value of the objective function is not less than q % of the whole; and
3) the value of the maximum objective function is not renewed in the following p times of generations.

M, q and p are inputted by a user beforehand.

A tire obtained in this embodiment was actually manufactured in trial, and tests were performed. Results are shown in the following Table 3.

TABLE 3

|  | Conventional tire | Embodiment |
| --- | --- | --- |
| Required time for design and development | 100 | 60 |
| Major strain at ply end | 100 | 50 |

Tire size: TBR295/75R225
Internal pressure: 7.15 kg/cm²
Load: 2500 kgf
Test method: feeling evaluation by actually running vehicle test Thus the third embodiment provides an effect that design of a tire having better performance can be made in a shorter period. Next, a fourth embodiment will be explained. In this embodiment, Young's modulus, which is a physical property of each of rubber members for relieving rolling resistance without deteriorating durability of a bead portion, is determined genetically by an algorithm. This embodiment has approximately the same constitution as the embodiment described above. Thus the same portions are designated by the same symbols, and detailed explanation is omitted.

The optimum rubber was found from a plurality types of rubber capable of being used in the third embodiment described above, while in this embodiment, an optimum Young's modulus is determined within a predetermined range capable of continuous change in the same manner as the first embodiment described above.

Figure 11:
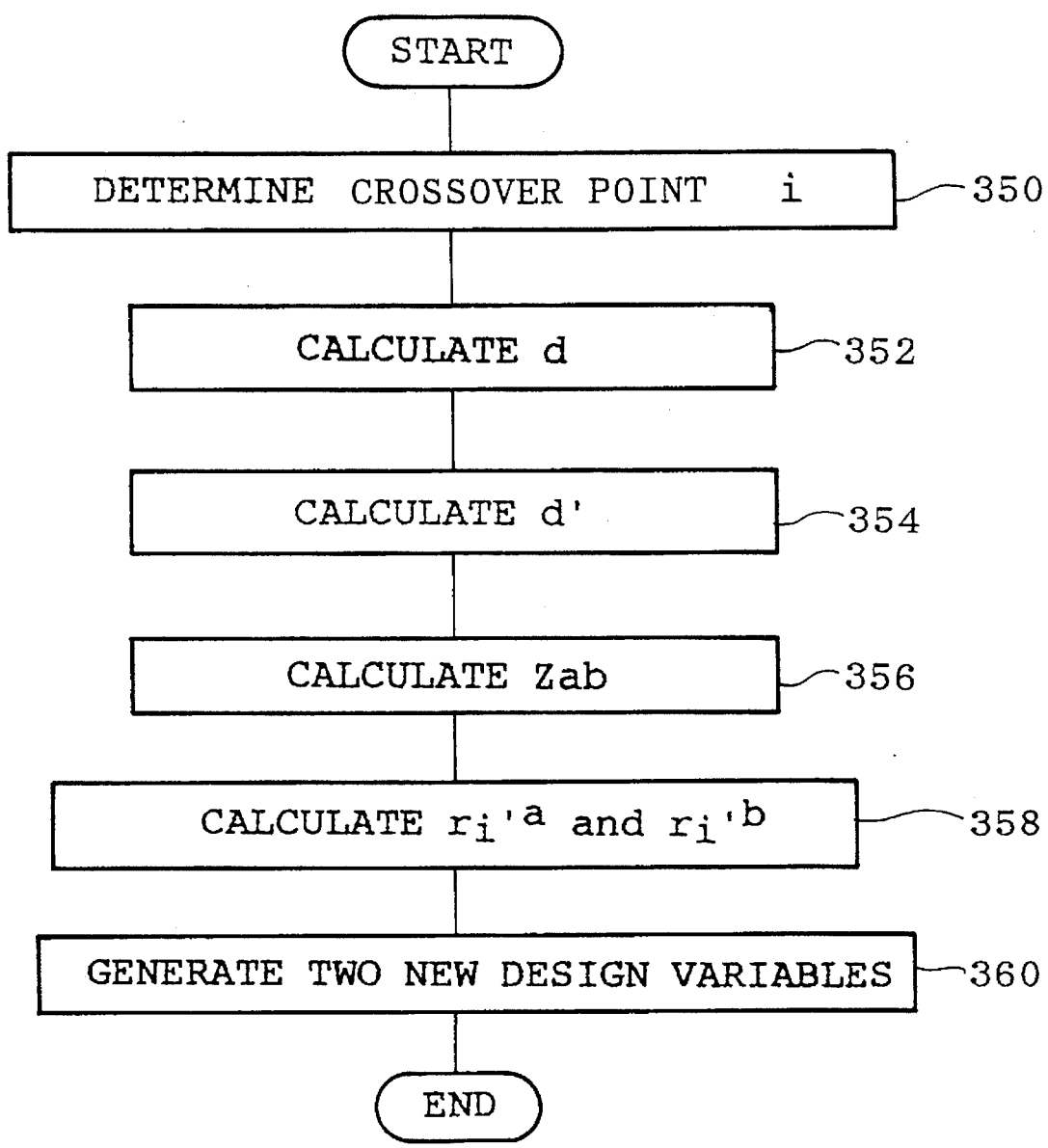
FIG. 11 is a flow chart showing an interchange processing routine of a fourth embodiment.

The processing in this embodiment is approximately the same as the processing in the third embodiment shown in FIG. 7A and FIG. 7B. However, the interchange processing and the mutation processing are different from those explained above. Interchange in this embodiment is performed on the basis of a processing routine shown in FIG. 11.

In the interchange of two tire models, at first, the two tire models selected in the step 308 explained above are regarded as a tire model (a) and a tire model (b). Design variables of each of the tire models (a) and (b) are represented by design variable vectors including arrays. The design variable vector of the tire model (a) is $Vr^a = (r_1^a, r_2^a, \ldots, r_i^a, \ldots, r_n^a)$, and the design variable vector of the tire model (b) is $Vr^b = (r_1^b, r_2^b, \ldots, r_i^b, \ldots, r_n^b)$. In a step 350 in FIG. 11, predetermined random numbers are generated, and an interchange place i relating to the design variable vectors of the tire models (a) and (b) is determined in accordance with the random numbers.

In the next step 352, a distance d is determined in accordance with the following equation (11) with respect to design variables $r_i^a$ and $r_i^b$ of the tire models (a) and (b) determined to be interchanged.

$$d = |r_i^a - r_i^b| \tag{11}$$

In the next step 354, a normalized distance d' is determined in accordance with the following equation by using a minimum value $B_L$ and a maximum value $B_u$ in a range capable of being encompassed by $r_i^a$ and $r_i^b$.

$$d' = d/[B_u - B_L] \tag{12}$$

Figure 12A:
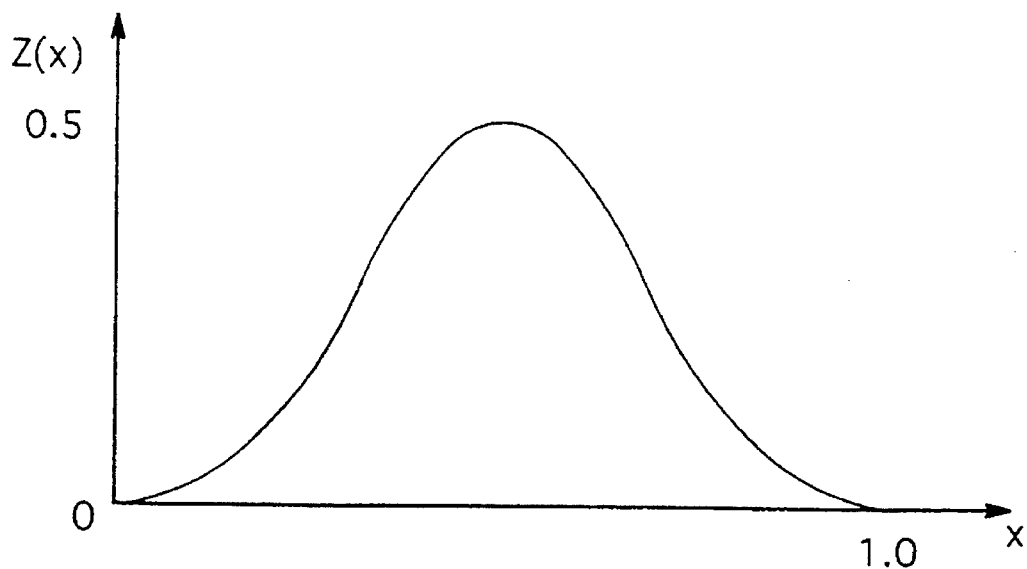
Figure 12B:
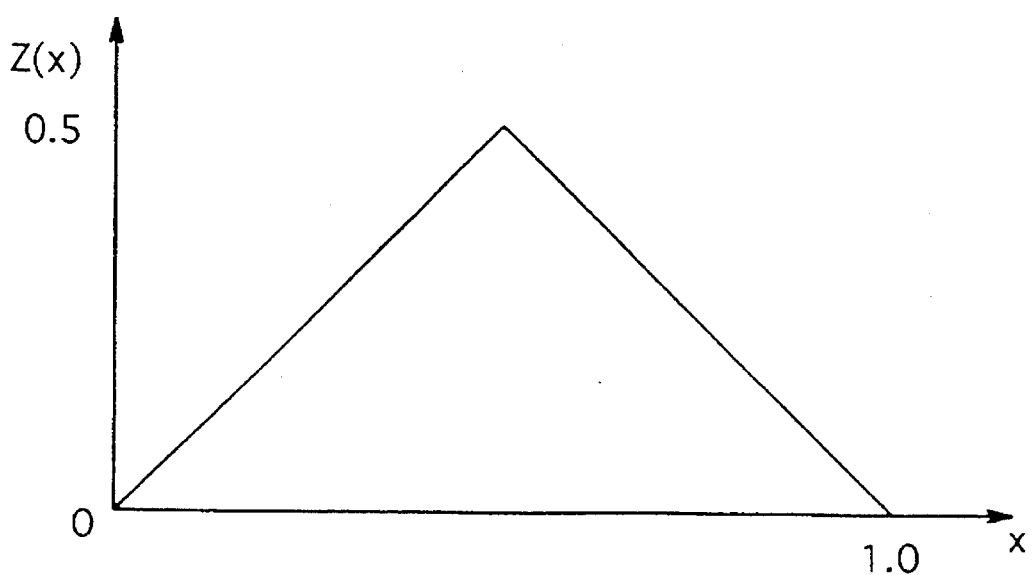

In a step 356, in order to adequately disperse the value of the normalized distance d', a function value $Z_{ab}$ is determined in accordance with the following equation (13) by using crest type mapping functions $Z(x)$ ($0 \leq x \leq 1$, $0 \leq Z(x) \leq 0.5$) as shown in FIG. 12A and FIG. 12B.

$$Z_{ab} = Z(d') \tag{13}$$

Thus after determining the function value $Z_{ab}$, new design variables $r_i^{'a}$ and $r_i^{'b}$ are determined in a step 358 in accordance with the following equation (14).

$$r_i^{'a} = r_i^a - [\min(|r_i^a - B_L|, |r_i^a - B_u|)/0.5] \cdot Z_{ab}$$

$$r_i^{'b} = r_i^b + [\min(|r_i^b - B_L|, |r_i^b - B_u|)/0.5] \cdot Z_{ab} \tag{14}$$

or $$r_i^{'a} = r_i^a + [\min(|r_i^a - B_L|, |r_i^a - B_u|)/0.5] \cdot Z_{ab}$$

$$r_i^{'b} = r_i^b - [\min(|r_i^b - B_L|, |r_i^b - B_u|)/0.5] \cdot Z_{ab}$$

Thus after determining the design variables $r_i^{'a}$ and $r_i^{'b}$, design variable vectors $Vr^{'a}$ and $Vr^{'b}$ as arrays of new design variables are determined in a step 360 as follows.

$$Vr^{'a} = (r_1^a, r_2^a, \ldots, r_i^{'a}, r_{i+1}^b, \ldots, r_n^b)$$

$$Vr^{'b} = (r_1^b, r_2^b, \ldots, r_i^{'b}, r_{i+1}^a, \ldots, r_n^a)$$

The minimum value $B_L$ and the maximum value $B_u$ in the range capable of being encompassed by the design variable $r_i$ are inputted beforehand by a user. Alternatively, the mapping function may be trough type functions shown in FIGS. 13A and 13B. Further, the interchange place is one in the embodiment described above. Besides, the plural points interchange or the uniform interchange may be used as described in "Genetic Algorithm" (edited by Hiroaki KITANO).

After generating the two new tire models by the interchange as described above, it is determined in the step 316 in FIG. 7A whether or not mutation is performed with a probability S inputted beforehand by a user. The mutation refers to minute alteration of a part of design variables as described below, which is intended to increase the probability to include a population capable of serving as optimum design variables. If no mutation is performed under a negative judgment in the step 316, the present two tire models are maintained in the step 326 to proceed to the next step 322. If mutation is performed under an affirmative judgment, mutation processing is performed in the next step 320 as follows.

Figure 14:
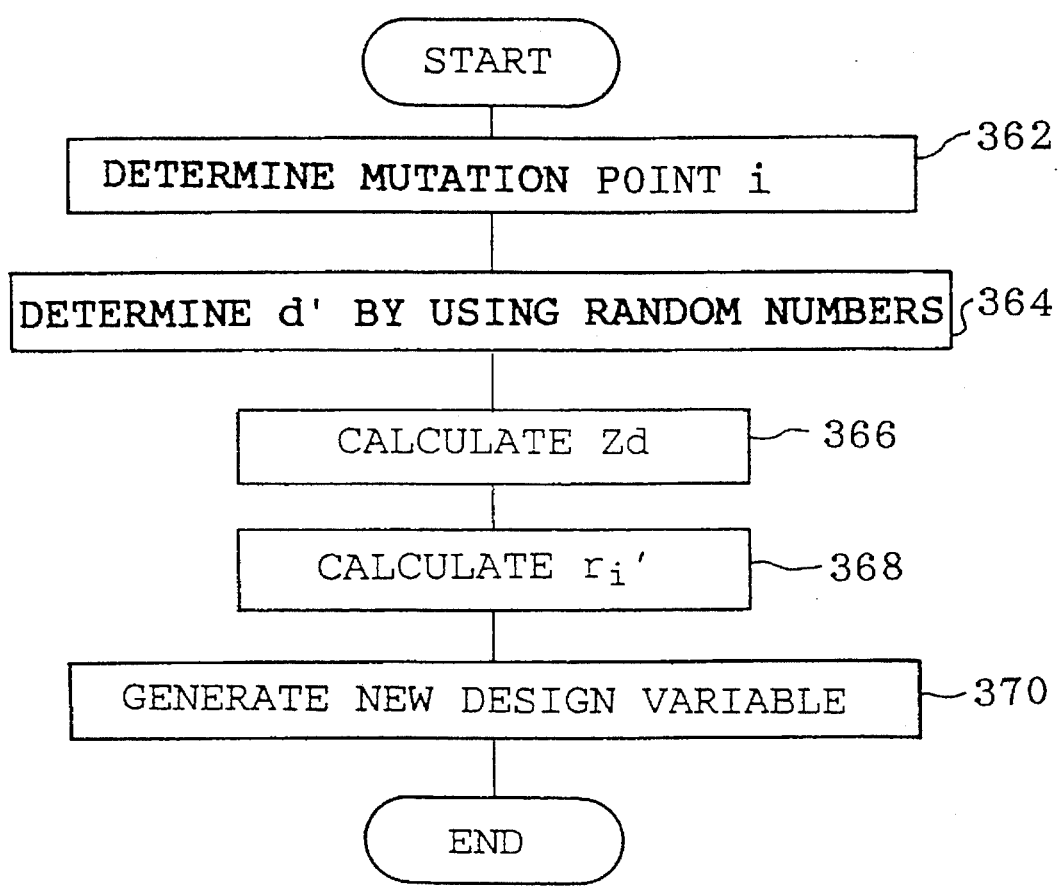
FIG. 14 is a flow chart showing a mutation processing routine of the fourth embodiment.

The mutation is performed by a mutation routine shown in FIG. 14. At first in a step 362, random numbers are generated, and a place i of mutation is determined by the random numbers. In the next step 364, the distance d' is determined within a predetermined range ($0 \leq d' \leq 1$) by using the random numbers.

Figure 13A:
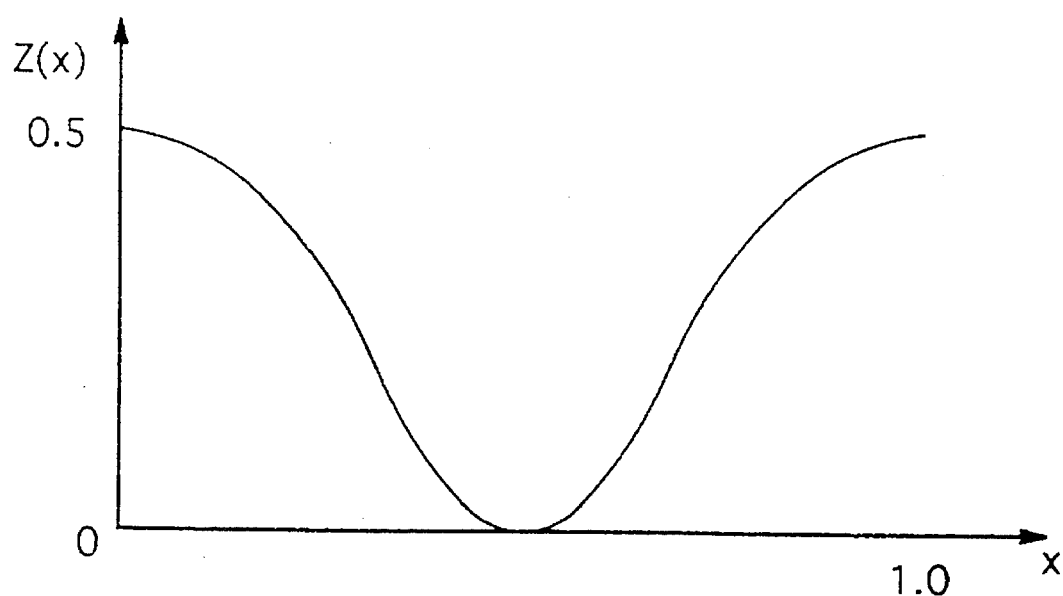
Figure 13B:
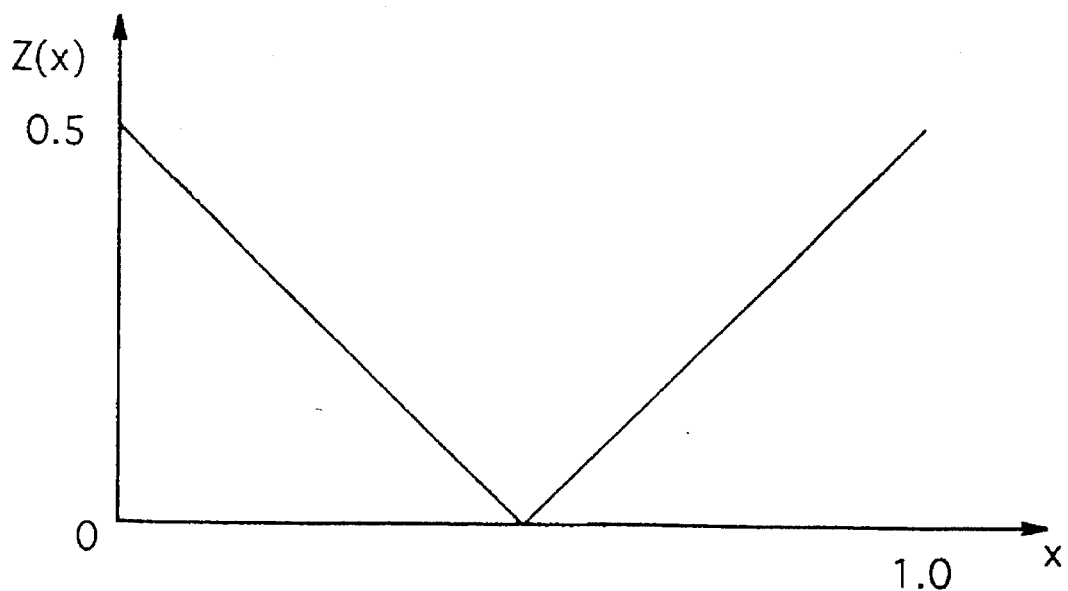

In the next step 366, the function value $Zd$ is determined in accordance with the following equation (15) by using the crest type mapping functions $Z(x)$ ($0 \leq x \leq 1$, $0 \leq Z(x) \leq 0.5$) shown in FIGS. 12A and 12B or the trough type mapping functions $Z(x)$ shown in FIGS. 13A and 13B.

$$Zd = Z(d') \tag{15}$$

Thus after determining the function value $Zd$, new design variable $r_i'$ is determined in a step 368 in accordance with the following equation (16).

$$r_i' = r_i - [\min(|r_i - B_u|)/0.5] \cdot Zd \tag{16}$$

or $$r_i' = r_i + [\min(|r_i - B_L|)/0.5] \cdot Zd$$

Thus after determining the design variable $r_i'$, a design variable vector $Vr'$ determined in a step 370 as an array of new design variables is as follows.

$$Vr' = (r_1, r_2, \ldots, r_i', r_{i+1}, \ldots, r_n)$$

In the step 370, a new tire model is generated from the determined design variable vector $Vr'$.

A tire obtained in this embodiment was actually manufactured in trial, and tests were performed. Results are shown in the following Table 4.

TABLE 4

|  | Conventional tire | Embodiment 4 |
|---|---|---|
| Required time for design and development | 100 | 75 |
| Rolling resistance value | 100 | 81 |
| Major strain at ply end | 100 | 99 |

Tire size: TBR295/75R22.5
Internal pressure: 7.15 kg/cm$^2$
Load: 2500 kgf
Test method: feeling evaluation by actually running vehicle test Thus the fourth embodiment provides an effect that the design of the tire having better performance than the conventional tire can be performed in a shorter period.

Next, a fifth embodiment will be explained. This embodiment is a combination of the first embodiment and the fourth embodiment. This embodiment is constituted in approximately the same manner as the embodiments described above. Thus the same portions are designated by the same symbols, and detailed explanation is omitted.

In the fourth embodiment explained above, the objective function and the constraint condition have been calculated in the step 322 on the basis of design plans obtained by the interchange and mutation. Such a procedure does not fall in a local optimum solution as described in Goldberg, D. E., "Genetic Algorithms in Search, Optimization and Machine Learning", Addison-Wesley (1989), however, it has a problem in that a true optimum solution is difficult to be determined. Thus, if the methods of the first embodiment and the fourth embodiment are combined by using the processing in the steps 104–118 of the first embodiment as a calculation processing in the step 322 of the fourth embodiment, the problem described above can be solved.

Figure 15A:
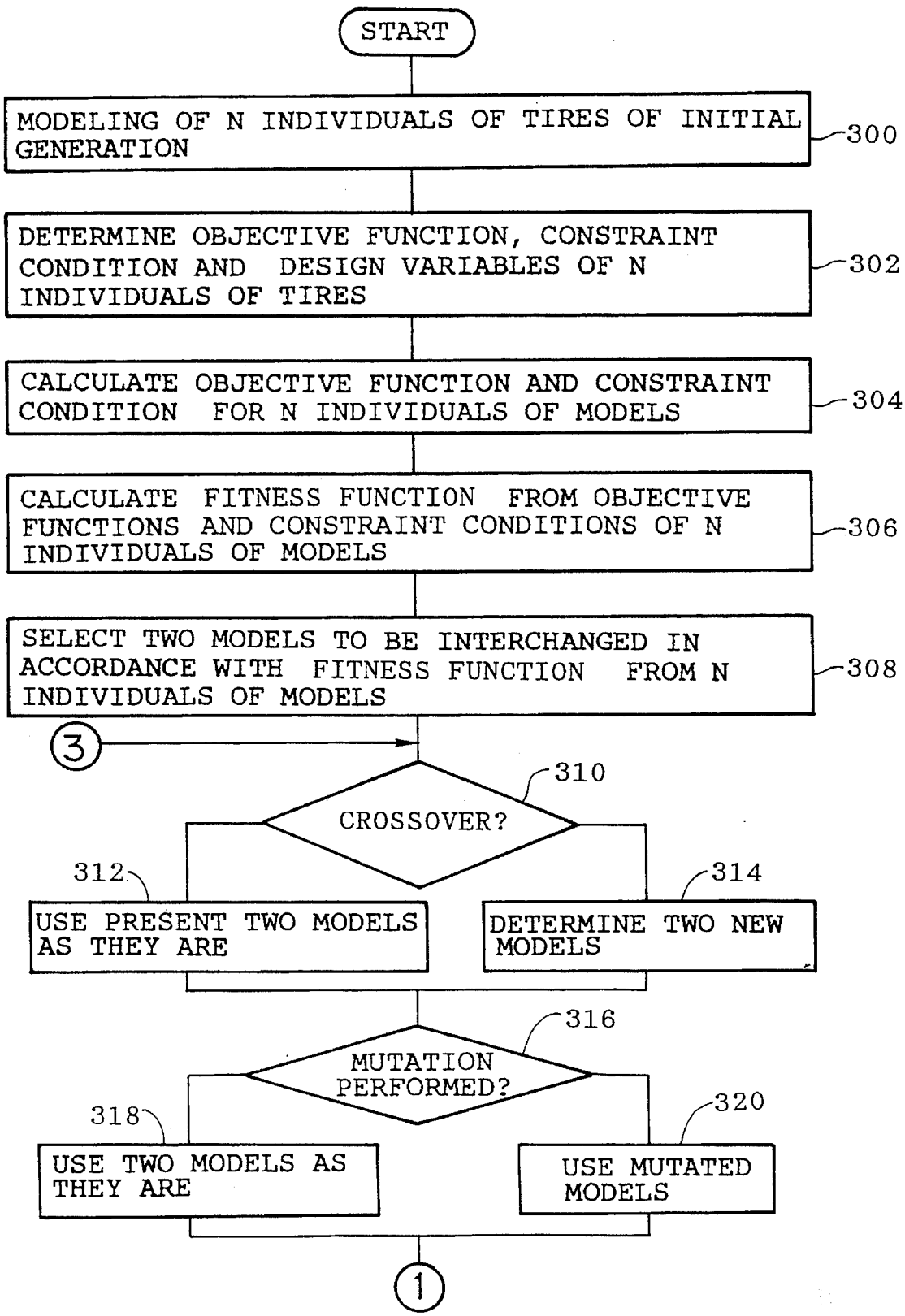
Figure 15B:
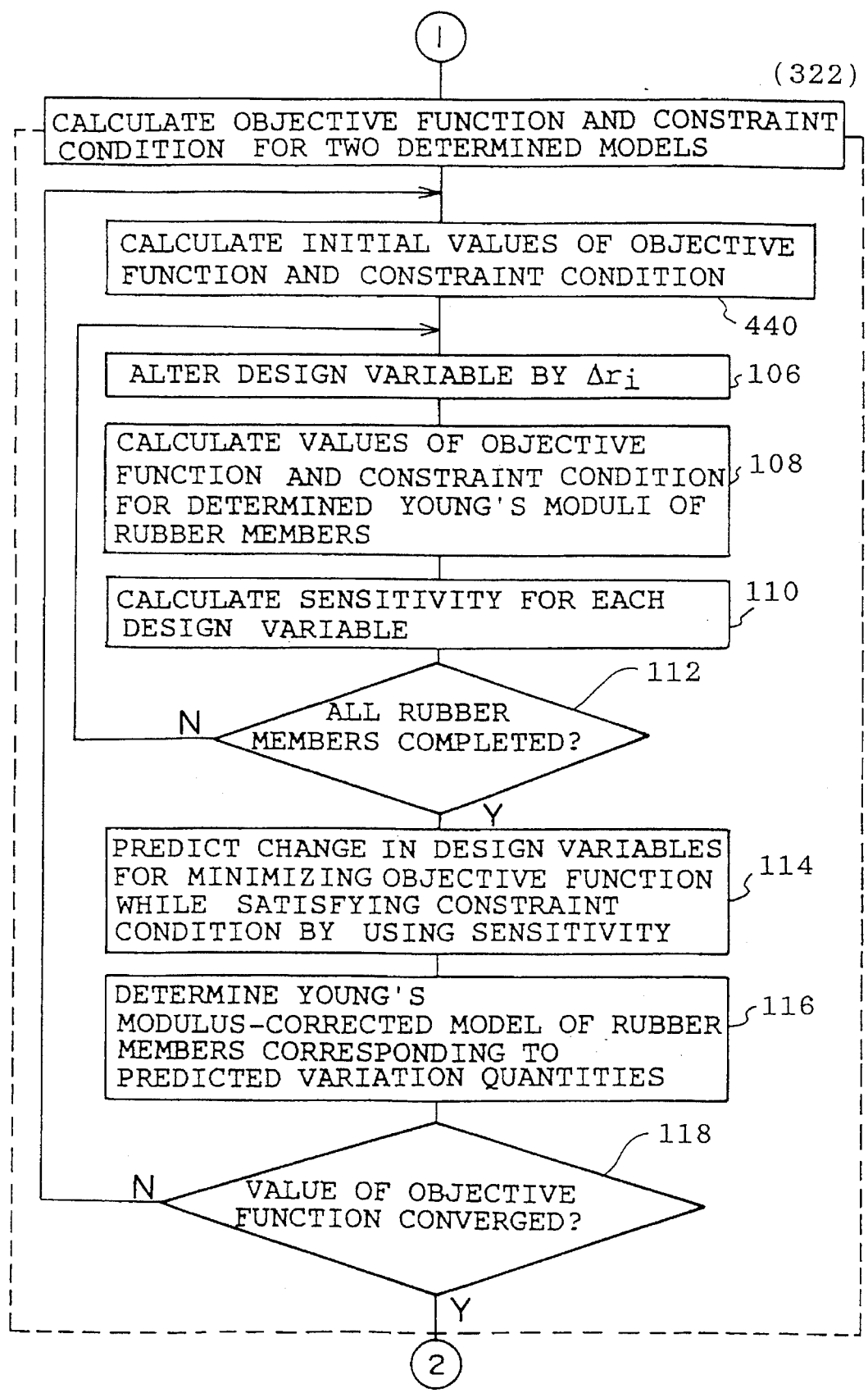

FIGS. 15A, 15B and 15C show a program processing routine of this embodiment. The steps 300–320 are the same as those of the fourth embodiment. Thus explanation is omitted.

In a step 340, the two design plans obtained as described above are used as initial design plans to calculate the objective function and the constraint condition. The next steps 106–118 are repeated and executed in the same manner as the processing in the first embodiment described above until the value of the objective function converges. If it is judged that the value of the objective function has converged, the adaptive function is calculated in the next step 324 from the value of the objective function and the value of the constraint condition having been obtained. The two tire models described above are stored in the next step 326. The step 308 to the step 328 are repeated and executed until the number of tire models stored in the step 326 arrives at N individuals. If it arrives at N individuals, a convergence judgment is made in the step 330 in the same manner as described above. In the case of convergence, values of design variables of a tire model, which minimize the value of the objective function while approximately satisfying the constraint condition among N individuals of the tire models, are regarded as values of design variables for minimizing the objective function while approximately satisfying the constraint condition. Young's modulus of each of the rubber members for constituting the tire is determined in the step 332 by using the values of design variables.

For such a method for obtaining a true optimum solution without falling in a local optimum solution, the method of the fourth embodiment may be combined with a method called as the Simulated Annealing method described in the reference described above, other than the technique described herein.

As explained above, according to the present invention, the design variables for giving the optimum value of the objective function considering the constraint condition are determined, and the tire which provides the optimum physical property of the rubber members and the optimum physical property of the reinforcing materials is designed in accordance with the design variables. Thus effects are obtained in that the design and development are highly efficient, and the tire having the best structure can be designed at low cost.

I claim:

1. A method for designing pneumatic tires comprising the steps of:

(a) determining a tire basic model for representing a tire cross-sectional shape including an internal structure, determining an objective function for representing a physical quantity for evaluation of tire performance, determining design variables for determining a physical property of rubber members and a physical property of reinforcing materials, and determining a constraint condition for constraining at least one of the physical property of the rubber members, the physical property of the reinforcing materials, the physical quantity for evaluation of performance, and a tire dimension degree;

(b) determining values of the design variables for giving an optimum value of the objective function while considering the constraint condition; and (c) designing a tire on the basis of the design variables which give the optimum value of the objective function.

2. The method for designing pneumatic tires according to claim 1, wherein in said step (b); variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; and values of the design variables for giving the optimum value of the objective function are determined while considering the constraint condition on the basis of the predicted values and the calculated values.

3. The method for designing pneumatic tires according to claim 1, wherein;

in said step (a); an object group for selection comprising a plurality of tire basic models for representing tire cross-sectional shapes including internal structures is determined; and an objective function for representing a physical quantity for evaluation of tire performance, design variables for determining a physical property of rubber members and a physical property of reinforcing materials, a constraint condition for constraining at least one of the physical property of the rubber members, the physical property of the reinforcing materials, the physical quantity for evaluation of performance and a tire dimension degree, and an adaptive function capable of being evaluated from the objective function and the constraint condition are determined for each of the tire basic models in the object group for selection; and in said step (b); two tire basic models are selected from said object group for selection on the basis of the adaptive function; at least one of generation of new tire basic models by interchanging the design variables of each of the tire basic models at a predetermined probability and generation of a new tire basic model by altering a part of the design variables of at least one of the tire basic models is performed; an objective function, a constraint condition and an adaptive function are determined for the tire basic model with changed design variables; the concerned tire basic model and the tire basic model with the unchanged design variables are stored; repetition is made until providing a predetermined number of stored tire basic models; it is judged whether or not a new group comprising the predetermined number of stored basic models satisfies a predetermined convergence condition; if the convergence condition is not satisfied, the new group is regarded as said object group for selection to make repetition until the object group for selection satisfies the predetermined convergence condition; and if the predetermined convergence condition is satisfied, values of the design variables for giving the optimum value of the objective function are determined while considering the constraint condition among the predetermined number of stored tire basic models.

4. The method for designing pneumatic tires according to claim 3, wherein in said step (b); for the tire basic model with the changed design variables, variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; the adaptive function is determined from the value of the objective function and the value of the constraint condition; the concerned tire basic model and the tire basic model with the unchanged design variables are stored; and repetition is made until providing a predetermined number of stored tire basic models.

5. The method for designing pneumatic tires according to claim 1, wherein said design variables reside in at least one of Young's modulus or Poisson's ratio of the rubber, and Young's modulus or Poisson's ratio of the anisotropic reinforcing material in each direction.

6. A method for producing pneumatic tires comprising the steps of:

(a) determining a tire basic model for representing a tire cross-sectional shape including an internal structure, determining an objective function for representing a physical quantity for evaluation of tire performance, determining design variables for determining a physical property of rubber members and a physical property of reinforcing materials, and determining a constraint condition for constraining at least one of the physical property of the rubber members, the physical property of the reinforcing materials, the physical quantity for evaluation of performance, and a tire dimension degree;

(b) determining values of the design variables for giving an optimum value of the objective function while considering the constraint condition;

(c) creating a tire design on the basis of the design variables which give the optimum value of the objective function; and (d) producing a tire based on the tire design.

7. The method for producing pneumatic tires according to claim 6, wherein in said step (b); variation quantities of the design variables for giving the optimum value of objective function are predicted while considering the constraint condition on the basis of a sensitivity of the objective function as a ratio of a variation quantity of the objective function to a unit variation quantity of the design variable and a sensitivity of the constraining condition as a ratio of a variation quantity of the constraint condition to the unit variation quantity of the design variable; a value of the objective function when the design variables are varied by quantities and a value of the constraint condition when the design variables are by quantities corresponding to the predicted quantities are calculated;

and values of the design variables for giving the optimum value of the objective function are determined while considering the constraint condition on the basis of the predicted values and the calculated values.

8. The method for producing pneumatic tires according to claim 6, wherein;

in said step (a); an object group for selection comprising a plurality of tire basic models for representing tire cross-sectional shapes including internal structures is determined; and an objective function for representing a physical quantity for evaluation of tire performance, design variables for determining a physical property of rubber members and a physical property of reinforcing materials, a constraint condition for constraining at least one of the physical property of the rubber members, the physical property of the reinforcing materials, the physical quantity for evaluation of performance and a tire dimension degree, and an adaptive function capable of being evaluated from the objective function and the constraint condition are determined for each of the tire basic models in the object group for selection; and in said step (b); two tire basic models are selected from said object group for selection on the basis of the adaptive function; at least one of generation of new tire basic models by interchanging the design variables of each of the tire basic models at a predetermined probability and generation of a new tire basic model by altering a part of the design variables of at least one of the tire basic models is performed; an objective function, a constraint condition and an adaptive function are determined for the tire basic model with changed design variables; the concerned tire basic model and the tire basic model with the unchanged design variables are stored; repetition is made until providing a predetermined number of stored tire basic models; it is judged whether or not a new group comprising the predetermined number of stored basic models satisfies a predetermined convergence condition; if the convergence condition is not satisfied, the new group is regarded as said object group for selection to make repetition until the object group for selection satisfies the predetermined convergence condition; and if the predetermined convergence condition is satisfied, values of the design variables for giving the optimum value of the objective function are determined while considering the constraint condition among the predetermined number of stored tire basic models.

9. The method for producing pneumatic tires according to claim 8, wherein in step (b); for the tire basic model with the changed design variables, variation quantities of the design variables for giving the optimum value of the objective function are predicted while considering the constraint condition on the basis of a sensitivity of the objective function as a ratio of a variation quantity of the objective function to a unit variation quantity of the design variable and a sensitivity of the constraint condition as a ratio of a variation quantity of the constraint condition to the unit variation quantity of the design variable; a value of the objective function when the design variables are varied by quantities corresponding to the predicted quantities and a value of the constraint condition when the design variables are varied by quantities corresponding to the predicted quantities are calculated; the adaptive function is determined from the value of the objective function and the value of the constraint condition; the concerned tire basic model and the tire basic model with the unchanged design variables are stored; and repetition is made until providing a predetermined number of stored tire basic models.

10. The method for producing pneumatic tires according to claim 6, wherein said design variables reside in at least one of Young's modulus or Poisson's ratio of the rubber, and Young's modulus or Poisson's ratio of the anisotropic reinforcing material in each direction.

* * * * *